United States Patent
Nanbu

(10) Patent No.: US 8,947,746 B2
(45) Date of Patent: Feb. 3, 2015

(54) IMAGE READING DEVICE

(71) Applicant: Kyocera Document Solutions Inc., Osaka (JP)

(72) Inventor: Sota Nanbu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/031,598

(22) Filed: Sep. 19, 2013

(65) Prior Publication Data

US 2014/0085685 A1 Mar. 27, 2014

(30) Foreign Application Priority Data

Sep. 21, 2012 (JP) ................................ 2012-208083
Sep. 21, 2012 (JP) ................................ 2012-208084
Sep. 21, 2012 (JP) ................................ 2012-208087

(51) Int. Cl.
*H04N 1/40* (2006.01)
*H04N 1/00* (2006.01)

(52) U.S. Cl.
CPC ....... *H04N 1/00755* (2013.01); *H04N 1/00729* (2013.01); *H04N 1/00708* (2013.01)
USPC ............ 358/449; 358/1.2; 358/474; 358/497; 399/370; 399/376

(58) Field of Classification Search
CPC combination set(s) only.
See application file for complete search history.

(56) References Cited

U.S. PATENT DOCUMENTS

| | | | | |
|---|---|---|---|---|
| 5,218,408 A * | 6/1993 | Inada et al. | ................... | 399/376 |
| 5,500,725 A * | 3/1996 | Takasu et al. | ................... | 399/17 |
| 5,778,276 A * | 7/1998 | Hasegawa | ....................... | 399/17 |
| 7,022,972 B2 * | 4/2006 | Fukatsu et al. | ............. | 250/222.1 |
| 7,558,524 B2 * | 7/2009 | Ooshima et al. | .............. | 399/370 |
| 7,615,768 B2 * | 11/2009 | Yamada | ................... | 250/559.36 |
| 7,715,066 B2 * | 5/2010 | Michiie | ........................ | 358/474 |
| 7,782,498 B2 * | 8/2010 | Hoshi | ............. | 358/474 |
| 8,115,975 B2 * | 2/2012 | Shinkawa | ..................... | 358/474 |
| 8,253,992 B2 * | 8/2012 | Shoda et al. | .................. | 358/474 |
| 8,289,585 B2 * | 10/2012 | Shinkawa | ..................... | 358/474 |
| 8,358,449 B2 * | 1/2013 | Seo | ............... | 358/474 |
| 8,467,110 B2 * | 6/2013 | Tanaka | ........................ | 358/475 |
| 2001/0043367 A1 * | 11/2001 | Ogino | .......................... | 358/449 |
| 2006/0028696 A1 * | 2/2006 | Michiie et al. | ................ | 358/474 |
| 2007/0201918 A1 * | 8/2007 | Shoda et al. | .................. | 399/376 |
| 2010/0103479 A1 * | 4/2010 | Seo | ................ | 358/474 |
| 2010/0232711 A1 * | 9/2010 | Takeshima | .................... | 382/206 |
| 2011/0181920 A1 * | 7/2011 | Kim | ............................ | 358/474 |
| 2013/0044357 A1 * | 2/2013 | Igawa et al. | .................. | 358/474 |
| 2014/0022605 A1 * | 1/2014 | Shimizu | ....................... | 358/449 |

FOREIGN PATENT DOCUMENTS

JP 11-075025 A 3/1999

* cited by examiner

*Primary Examiner* — Dung Tran
(74) *Attorney, Agent, or Firm* — Studebaker & Brackett PC

(57) ABSTRACT

An image reading device includes a platen glass, a document feeder, a light source, a light receiving section, a first opening/closing detection sensor, a second opening/closing detection sensor, and a document size determination section. The document size determination section determines a size of an original document on the basis of a measurement result from the light receiving section. Where the first opening/closing detection sensor indicates the open state, while the second opening/closing detection sensor indicates no open state when the original document is placed on the platen glass, the document size determination section determines a size of the original document in a main scanning direction on the basis of full lighting-up determination data obtained with all of plural light emitting elements lighted up and partial lighting-up determination data obtained with some of the plural light emitting elements lighted up.

12 Claims, 15 Drawing Sheets

IMAGE READING DEVICE

INCORPORATION BY REFERENCE

The present application claims priority under 35 U.S.C. §119 to Japanese Patent Applications Nos. 2012-208083, 2012-208084, and 2012-208087, each filed Sep. 21, 2012. The contents of this application are incorporated herein by reference in their entirety.

BACKGROUND

The present disclosure relates to image reading devices.

Electronic copiers, facsimile machines, etc. are known as image forming apparatuses including an original document reading device that reads an original document, such as a photograph, a document, or the like placed on a platen glass. It is known that such an image forming apparatus first determines the size of an original document placed on the platen glass and performs then control on reading, selection of paper to be printed, etc. on the basis of the determined original document size.

In order to determine the original document size, it is proposed to utilize image data read by a scanner that reads an original document. One type of the image forming apparatus is provided with an opening/closing detection means that detects opening/closing of a platen cover in a two-step manner. When a state in which the platen cover is being closed is detected, first scan is performed. When a state in which the platen cover is closed fully is detected, second scan is performed. On the basis of line sensor output obtained by the two-time scan, the original document size is determined

SUMMARY

An image reading device according to the present disclosure includes: a platen glass, a platen cover, a light source, a light receiving section, a first opening/closing detection section, a second opening/closing detection section, and a document size determination section. An original document is placed on the platen glass. The platen cover is capable of opening/closing the platen glass. The light source includes a plurality of light emitting elements arranged in a main scanning direction, each of the light emitting elements being configured to irradiate light. The light receiving section receives light from the light source. The first opening/closing detection section determines on the basis of a first reference whether the platen cover is in an open state or a closed state relative to the platen glass. The second opening/closing detection section determines on the basis of a second reference, which is different from the first reference, whether the platen cover is in an open state or a closed state relative to the platen glass. The document size determination section determines a size of the original document on the basis of a measurement result from the light receiving section.

Where determination results from the first opening/closing detection section and the second opening/closing detection section indicate the open state when the original document is placed on the platen glass: when the determination result from the second opening/closing detection section is changed from the open state to the closed state, the light receiving section obtains first full lighting-up determination data, which is measured with all of the plurality of light emitting elements lighted up; when the determination result from the first opening/closing detection section is changed from the open state to the closed state, the light receiving section obtains second full lighting-up determination data, which is measured with all of the plurality of light emitting elements lighted up; and the document size determination section determines a size of the original document in the main scanning direction on the basis of the first full lighting-up determination data and the second full lighting-up determination data.

Where the determination result from the first opening/closing detection section indicates the open state, and the determination result from the second opening/closing detection section indicates no open state when the original document is placed on the platen glass: when the determination result from the first opening/closing detection section is changed from the open state to the closed state, the light receiving section obtains the second full lighting-up determination data, which is measured with all of the plurality of light emitting elements lighted up, and obtains partial lighting-up determination data, which is measured with some of the light emitting elements of the plurality of light emitting elements lighted up; and the document size determination section determines the size of the original document in the main scanning direction on the basis of the second full lighting-up determination data and the partial lighting-up determination data.

DETAILED DESCRIPTION (Embodiment 1)

Embodiments of the present disclosure will be described specifically below with reference the accompanying drawings. It is noted that like numerals denote like elements or corresponding elements in each drawing.

Figure 1:
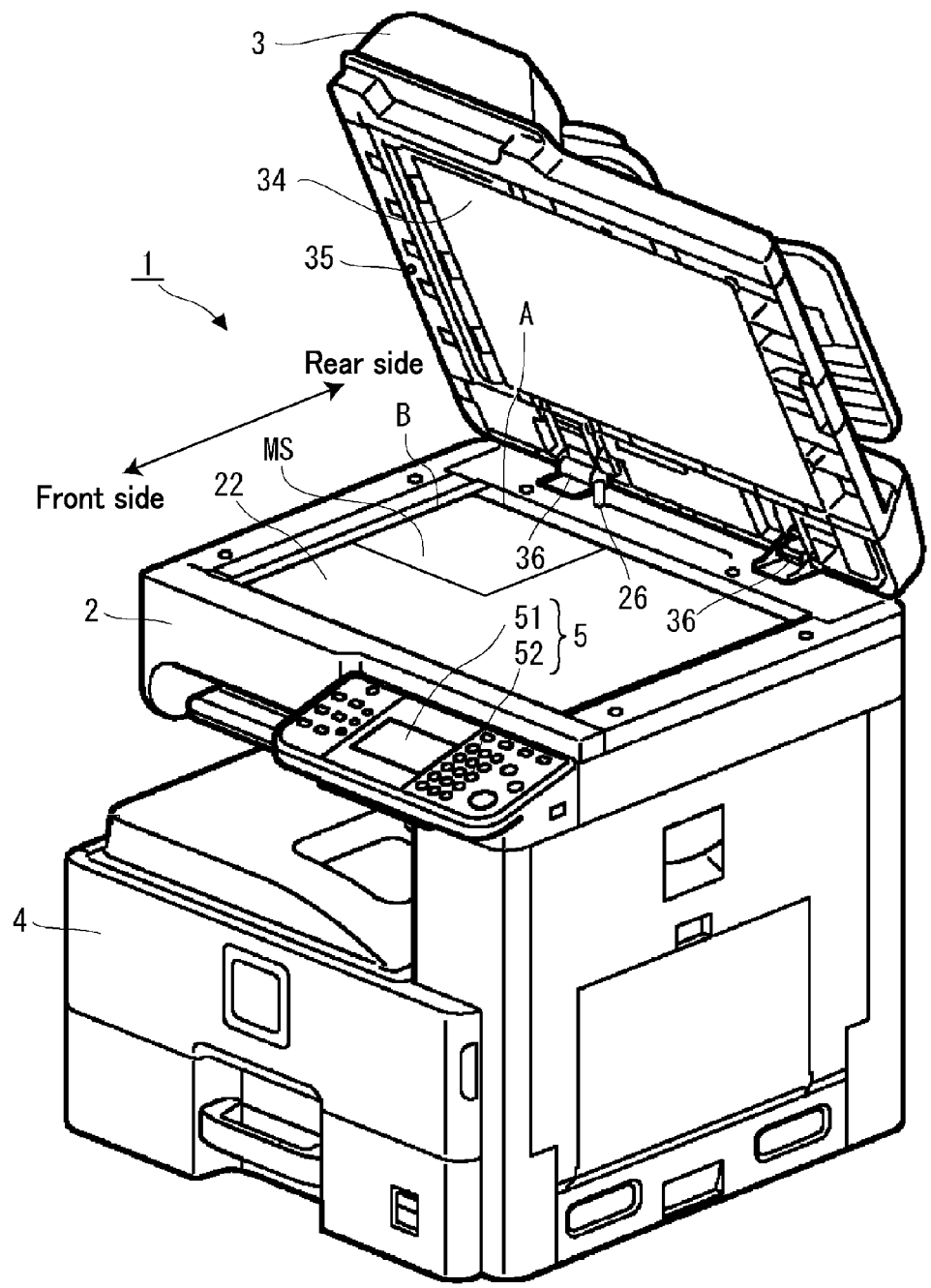
FIG. 1 is an external perspective view showing a configuration of an image forming apparatus including an image reading device according to one embodiment of the present disclosure.

One example of an image forming apparatus including an image reading device according to the present embodiment is a copier 1. As shown in FIG. 1, the copier 1 includes a document reading section 2, a document feeder 3, a main body 4, and an operation section 5. The document reading section 2 is arranged above the main body 4. The document feeder 3 is arranged on the document reading section 2. It is noted that an original document MS is placed on a platen glass 22 in the present embodiment. For example, alignment of the original document MS is carried out using the side on the rear side of the platen glass 22 (hereinafter referred to as a main scanning direction reference line A) and the side on the left side thereof when viewed toward the rear side (hereinafter referred to as a sub scanning direction reference line B). Here, the main scanning direction reference line A is located at the edge of the platen glass 22 exposed on the surface of the document reading section 2.

The operation section 5 is arranged on the front side of the copier 1. The document feeder 3 is connected to the document reading section 2 above the rear side of the copier 1 by means of a hinge mechanism 36. When the document feeder 3 is opened upward from the front side, the platen glass 22 becomes open on the upper surface of the document reading section 2. It is noted that although the copier 1 including an image reading device will be described herein, it is needless to say that the image reading device can be included in a scanner, a multifunction peripheral, etc.

On the front side of the copier 1, the operation section 5 is arranged which performs settings and operation instructions of the copier 1. The operation section 5 includes a liquid crystal display unit 51 and an operation button set 52.

Figure 2:
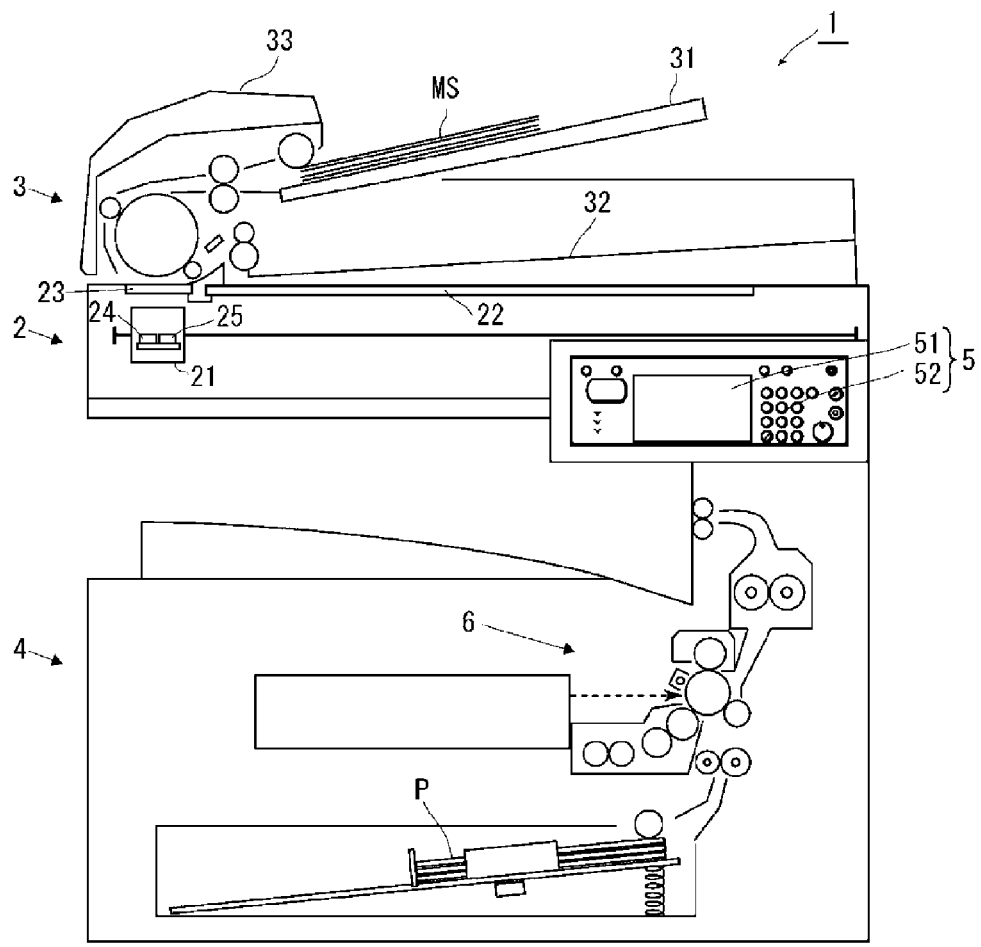
FIG. 2 is a schematic cross sectional view showing an internal configuration of the image forming apparatus including the image reading device according to one embodiment of the present disclosure.

As shown in FIG. 2, the document reading section 2 includes a scanner 21, the platen glass 22, and a document reading slit 23. The scanner 21 includes a light source 24 including light emitting elements (e.g., light emitting diodes (LED)), and a light receiving section 25 including a charge coupled device (CCD) line sensor, a complementary metal oxide semiconductor (CMOS) line sensor, or the like. The scanner 21 is movable in a direction in which the document feeder 3 conveys an original document.

Figure 3:
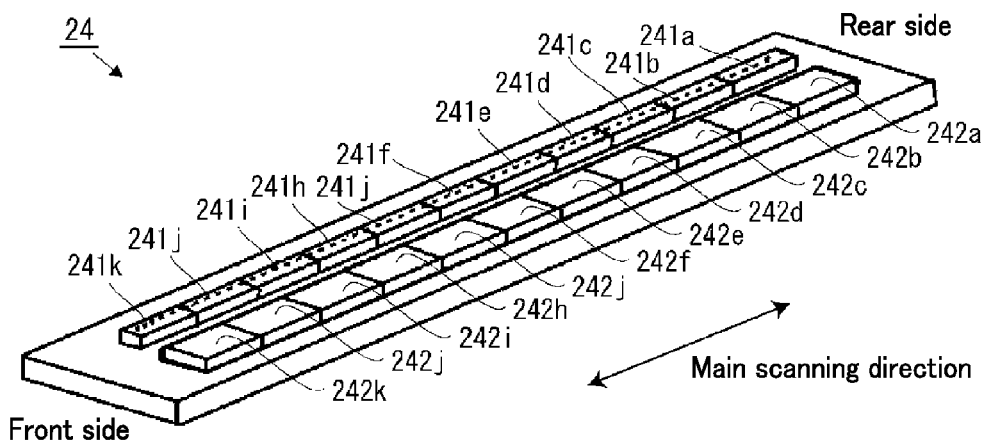
FIG. 3 is an external perspective view showing a configuration of a light source shown in FIG. 2.

As shown in FIG. 3, the light source 24 includes a plurality of LED arrays 241a-241k arranged in a main scanning direction from the rear side toward the front side and a plurality of drive circuits 242a-242k that drive the corresponding LED arrays 241a-241k. It is noted that each of the LED arrays 241a-241k is an element in which a plurality of LEDs are arranged one-dimensionally. The platen glass 22 is a document table formed of a rectangular transparent member, such as glass, etc. is and arranged on the upper surface of the document reading section 2. The document reading slit 23 is formed to extend in a direction orthogonal to the direction in which the document feeder 3 conveys an original document.

Referring again to FIG. 2, the document feeder 3 includes a document placement section 31, a document ejection section 32, and a document conveyance mechanism 33. The original document MS placed on the document placement section 31 is fed on a sheet-by-sheet basis by the document conveyance mechanism 33 to be conveyed to a site facing the document reading slit 23 and is then ejected by the document ejection section 32.

The document feeder 3 functions as a platen cover to open/close the upper surface of the platen glass 22. When the document feeder 3 is opened upward, the upper surface of the platen glass 22 becomes open so that an original document can be placed on the platen glass 22. The document feeder 3 includes a white document pressing surface 34 (see FIG. 1) on its surface facing the platen glass 22.

Referring to FIG. 1, the document reading section 2 and the document feeder 3 include a second opening/closing detection sensor 26 and a first opening/closing detection sensor 35, respectively, as opening/closing detection sections (opening/closing detection means) that detect opening/closing of the document feeder 3 (platen cover). The first opening/closing detection sensor 35 is a microswitch that determines whether the document feeder 3 (platen cover) is in an open state or a closed state. Here, when the document feeder 3 (platen cover) are in contact with the document reading section 2 substantially in their entire surfaces facing each other, the first opening/closing detection sensor 35 determines that the document feeder 3 (platen cover) is in the closed state to be turned on. By contrast, when the document feeder 3 (platen cover) separates from the document reading section 2, the first opening/closing detection sensor 35 determines that the document feeder 3 (platen cover) is in the open state to be turned off.

The second opening/closing detection sensor 26 is a microswitch that determines whether the document feeder 3 is in an open state or a closed state. When the document feeder 3 is in the closed state, the second opening/closing detection sensor 26 is turned on. By contrast, when the document feeder 3 is in the open state, it is turned off. For example, the second opening/closing detection sensor 26 determines whether or not an angle of the document feeder 3 with respect to the platen glass 22 exceeds a predetermined threshold angle. When the angle of the document feeder 3 with respect to the platen glass 22 is equal to or smaller than the threshold angle, the second opening/closing detection sensor 26 is turned on. When the angle of the document feeder 3 with respect to the platen glass 22 exceeds the threshold angle, the second opening/closing detection sensor 26 is turned off. It is noted that the threshold angle according to which the second opening/closing detection sensor 26 is turned on/off is set as follows, for example. When the document reading section 2 reads image data in a state in which the angle of the document feeder 3 with respect to the platen glass 22 exceeds the threshold angle, the threshold angle is set so that an image is formed in the light receiving section 25 in a region of the platen glass 22 where the original document MS is not placed even if light irradiated from the light source 24 is reflected by the platen cover.

As described above, the first opening/closing detection sensor 35 determines whether the document feeder 3 is in the open state or the closed state. The second opening/closing detection sensor 26 also determines whether the document feeder 3 is in the open state or the closed state. However, a reference (first reference) for determination by the first opening/closing detection sensor 35 as to whether the document feeder 3 is in the open state or the closed state is different from a reference (second reference) for determination by the second opening/closing detection sensor 26 as to whether the document feeder 3 is in the open state or the closed state. Here, the point of the document feeder 3 where the determination result from the second opening/closing detection sensor 26 (open state or closed state) is changed is separate from the platen glass 22 farther than the point of the document feeder 3 where the determination result from the first opening/closing detection sensor 35 (open state or closed state) is changed. For this reason, it is possible that the first opening/closing detection sensor 35 determines that the document feeder 3 is in the open state, while the second opening/closing detection sensor 26 determines that the document feeder 3 is in the closed state even when the document feeder 3 is positioned at the same point.

When an instruction to read an original document is input through the operation button set 52 of the operation section 5 even in the state in which no original document is not placed on the document placement section 31 or even in which the document feeder 3 is opened, the scanner 21 performs reading. In order to read an original document MS placed on the platen glass 22, the scanner 21 is moved to a site facing the platen glass 22, reads the original document MS placed on the platen glass 22 while performing scan from the sub scanning direction reference line B in a sub scanning direction orthogonal to the main scanning direction to obtain image data, and then outputs the obtained image data to the main body 4.

Here, when an instruction to read an original document is input through the operation button set 52 of the operation section 5 in the state in which the original document MS is placed on the document placement section 31, the original document conveyed by the document feeder 3 is read.

As shown in FIG. 2, the main body 4 includes a recording section 6, in which an image is formed on recording paper.

Figure 4:
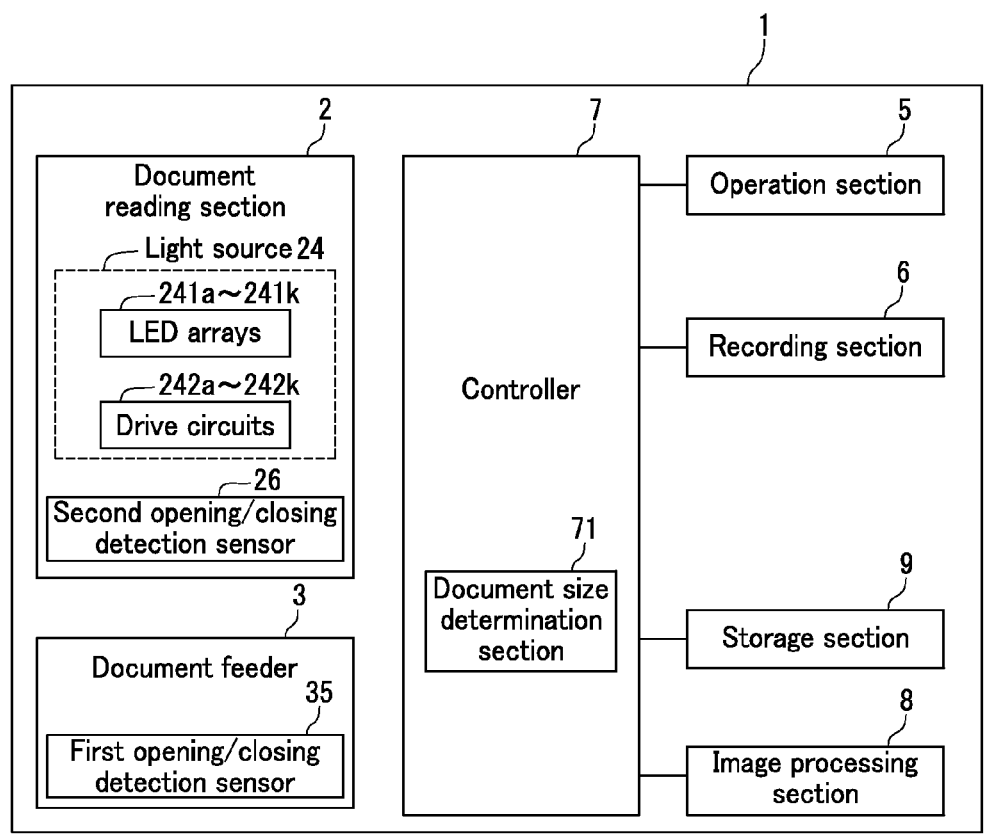
FIG. 4 is a block diagram schematically showing a configuration of a copier show in FIGS. 1 and 2.

FIG. 4 is a block diagram showing a schematic configuration of the copier 1. The document reading section 2, the document feeder 3, the operation section 5, and the recording section 6 are connected to a controller 7. The controller 7 controls each operation of them. Further, the controller 7 is connected to an image processing section 8 and a storage section 9. The image processing section 8 performs image processing on image data obtained in the image reading section 2.

The storage section 9 is a storage device, such as a semiconductor memory, a hard disk drive (HDD), or the like. The storage section 9 stores various types of management information necessary for control by the controller 7 and information that is temporarily necessary. For example, the storage section 9 stores the size of an original document supposed as an original document to be placed on the copier 1. Typically, plural types of sizes of the original documents as supposed original documents are stored. Further, the storage section 9 stores image data, which the document reading section 2 obtains by reading an original document.

The controller 7 is an information processing section, such as a microcomputer including a read only memory (ROM), a random access memory (RAM), etc. The ROM stores a control program for operation control on the copier 1. The controller 7 reads out the control program stored in the ROM and to allow the RAM to decompress the control program. Thereafter, the controller 7 performs control on the entire copier 1 according to an instruction from the operation section 5. Further, the controller 7 allows the document reading section 2 to obtain plural pieces of determination data according to the respective on/off information from the second opening/closing detection sensor 26 and the first opening/closing detection sensor 35. The controller 7 then functions as a document size determination section 71 to determine the size of the original document MS on the basis of the plural pieces of determination data.

It is noted that the determination data is obtained by width determining scan and length determining scan by the document reading section 2. The width determining scan by the document reading section 2 is scan to obtain determination data for determination of the size of the original document MS in the main scanning direction. The width determining scan obtains image data for one line to plural lines from the sub scanning direction reference line B in the sub scanning direction. Accordingly, the image data for one line to plural lines obtained by scan in the sub scanning direction from the sub scanning direction reference line B serves as the determination data.

By contrast, the length determining scan by the document reading section 2 is scan to obtain determination data for determination of the size of the original document MS in the sub scanning direction. The length determining scan obtains image data in a range over a maximum length LMAX of a supposed original document in the sub scanning direction from the sub scanning direction reference line B. Accordingly, the image data in the range over the maximum length LMAX in the sub scanning direction from the sub scanning direction reference line B serves as the determination data.

A document size determination operation in the copier 1 according to the present embodiment will be described next in detail with reference to FIGS. 5-8B, in addition to FIGS. 1-4, which have been referred to in the above description.

In order to detect a series of operation (step S1) of opening the document feeder 3 and placing an original document MS on the platen glass 22 by an operator, the controller 7 functions as the document size determination section 71 to observe whether or not the first opening/closing detection sensor 35 is turned off, that is, whether or not the document feeder 3 is in the open state with reference to the first reference (step S2).

When it is detected in the step S2 that the first opening/closing detection sensor 35 is turned off, that is, that the document feeder 3 is in the open state (Yes in step S2), the document size determination section 71 observes whether or not the second opening/closing detection sensor 26 is turned off, that is, whether or not the angle of the document feeder 3 with respect to the platen glass 22 exceeds the threshold angle serving as the second reference (step S3). When the second opening/closing detection sensor 26 is not turned off, that is, when the angle of the document feeder 3 with respect to the platen glass 22 is equal to or smaller than the threshold angle (No in step S3), the document size determination section 71 observes whether or not the first opening/closing detection sensor 35 is turned on, that is, whether or not the document feeder 3 is in the closed state (step S4).

When it is detected in the step S3 that the second opening/closing detection sensor 26 is turned off, that is, that the angle of the document feeder 3 with respect to the platen glass 22 exceeds the threshold angle (Yes in step S3), the document size determination section 71 then observes whether or not the second opening/closing detection sensor 26 is turned on, that is, whether or not the angle of the document feeder 3 with respect to the platen glass 22 is equal to or smaller than the threshold angle (the step S5). According to the step S5, the timing can be detected at which the document feeder 3 is being closed after the original document MS is placed on the platen glass 22 with the document feeder 3 largely opened with respect to the platen glass 22.

Figure 6A:
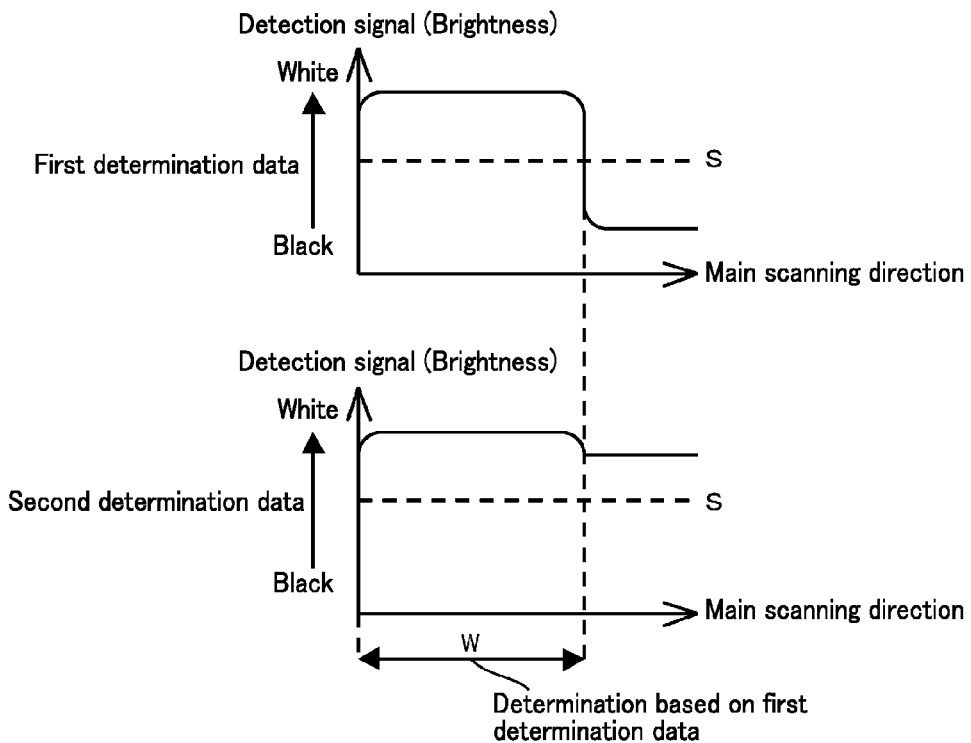
FIGS. 6A and 6B are explanatory drawings for explaining a document size determination operation based on first determination data and second determination data in the image reading device according to one embodiment of the present disclosure.
Figure 6B:
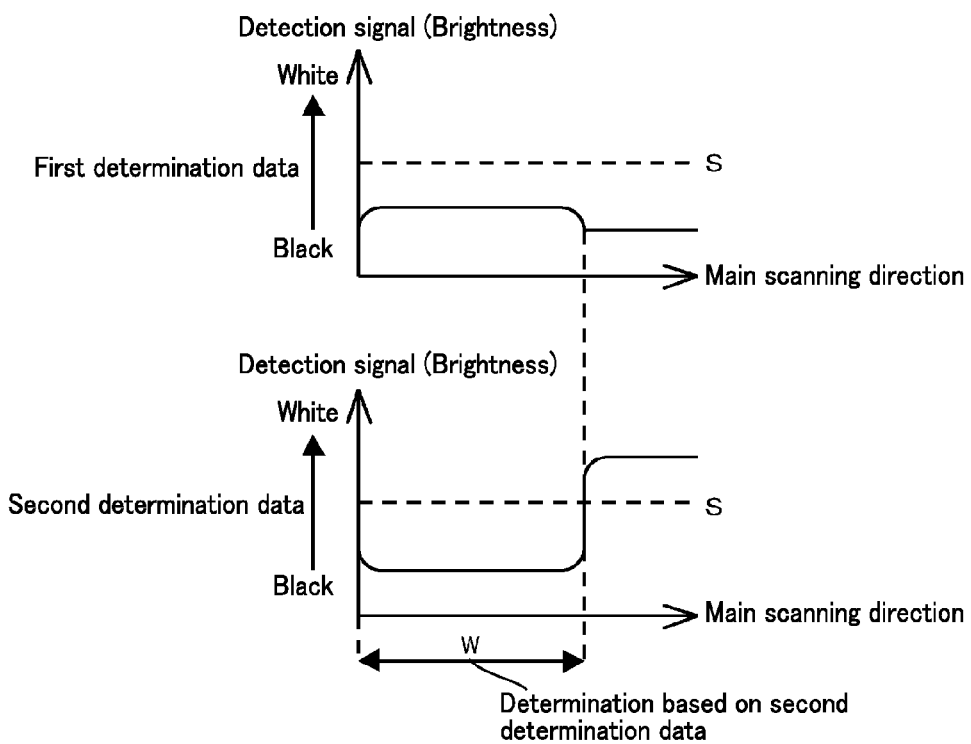

When it is detected in the step S5 that the second opening/closing detection sensor 26 is turned on, that is, that the angle of the document feeder 3 with respect to the platen glass 22 is equal to or smaller than the threshold angle, the document size determination section 71 allows the document reading section 2 to execute the width determining scan to obtain the first determination data (step S6). In the step S6, the document reading section 2 performs the width determining scan with the document feeder 3 slightly opened, thereby obtaining the first determination data (first full lighting-up determination data) as shown in FIGS. 6A and 6B. By this width determining scan, the first determination data is obtained which is measured with all of the plurality of LED arrays 241a-241k lighted up.

Referring to FIGS. 6A and 6B, the axis of abscissa denotes position in the main scanning direction, while the axis of ordinate denotes brightness that a detection signal in the light receiving section 25 indicates. It is noted that the brightness indicated by the detection signal in the light receiving section 25 increases as the color of a placed original document MS is brighter (white) and decreases as a placed original document MS is darker (black).

Next, the document size determination section 71 observes whether or not the first opening/closing detection sensor 35 is turned on, that is, whether or not the document feeder 3 is in the closed state (step S7). When it is detected in the step S7 that the first opening/closing detection sensor 35 is turned on, that is, that the document feeder 3 is in the closed state (Yes in step S7), the document size determination section 71 allows the document reading section 2 to execute the width determining scan to obtain the second determination data (step S8). In the step S8, the document reading section 2 performs the width determining scan in a state in which the document feeder 3 is in the closed state. As a result, the second determination data (second full lighting-up determination data) as shown in FIGS. 6A and 6B is obtained.

By this width determining scan, the second determination data is obtained which is measured with all of the plurality of LED arrays 241a-241k lighted up.

FIG. 6A shows the first and second determination data in the case where the color (ground, first coat, background) of the original document MS itself is white. FIG. 6B shows the first and second determination data in the case where the color of the original document MS itself is black. In both FIGS. 6A and 6B, the document pressing surface 34 is white.

Subsequently, the document size determination section 71 determines the size of the original document MS in the main scanning direction on the basis of the first determination data (first full lighting-up determination data) obtained in the step S6 and the second determination data (second full lighting-up determination data) obtained in the step S8 (step S9). The document size determination section 71 compares the first and second determination data with a predetermined threshold value S to determine the size of the original document MS in the main scanning direction. Where the reflectivity of the original document MS itself is comparatively high (e.g., the original document MS itself is white), difference in brightness between a region of the original document MS and a region other than the original document MS is large as indicated by the detection signal in the first determination data shown in FIG. 6A in the light receiving section 25. Accordingly, by appropriately setting the threshold value S, a region having a brightness equal to or larger than the threshold value S can be determined as a region of the size of the original document MS in the main scanning direction on the basis of the first determination data.

By contrast, where the reflectivity of the original document MS itself is comparatively low (e.g., the original document MS itself is black), difference in brightness between the region of the original document MS and the other region is large as indicated by the detection signal in the second determination data shown in FIG. 6B in the light receiving section 25. Accordingly, by appropriately setting the threshold value S, a region having a brightness smaller than the threshold value S can be determined as a region of the size of the original document MS in the main scanning direction on the basis of the second determination data.

When it is detected in the step S4 that the first opening/closing detection sensor 35 is turned on, that is, that the document feeder 3 is in the closed state, while it is not detected in the step S3 that the second opening/closing detection sensor 26 is turned off, that is, that the angle of the document feeder 3 with respect to the platen glass 22 exceeds the threshold angle (No in step S3), the document size determination section 71 allows the document reading section 2 to execute the width determining scan, thereby obtaining third determination data (step S10).

Figure 7:
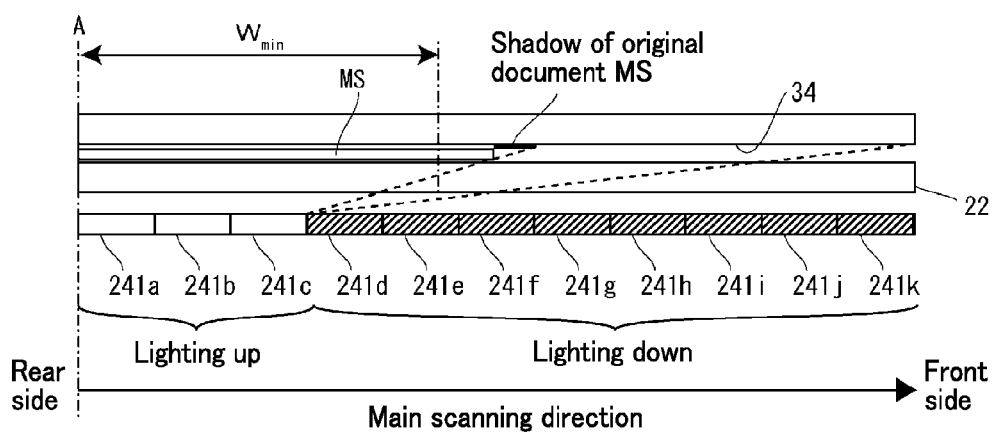
FIG. 7 is a diagram showing a lighting-up state of the light source in obtaining third determination data in the image reading device according to one embodiment of the present disclosure.

Further, the document size determination section 71 obtains the second determination data through an operation similar to that in the step S8 (step S12). Different from the width determining scan in the other steps S6, S8, and S12, the width determining scan in the step S10 by the document reading section 2 to obtain the third determination data is performed with only some of the plurality of LED arrays 241a-241k lighted up, as shown in FIG. 7. The width determining scan performed herein can obtain the third determination data (partial lighting-up determination data), which is measured with some of the plurality of LED arrays 241a-241k lighted up. A light-up range of the plurality of LED arrays 241a-241k is narrower than a minimum width WMIN of a supposed original document from the main scanning direction reference line A. In the example shown in FIG. 7, the width determining scan is performed with the LED arrays 241a-241c lighted up and the other LED arrays 241d-241k lighted down. This can provide, on the document pressing surface 34, a shadow of a side of the original document MS, which is apart from the main scanning direction reference line A. Accordingly, the brightness of the detection signal in the region of the document pressing surface 34 where the shadow is provided is low in the third determination data obtained in the step S10, as shown in FIGS. 8A and 8B.

Figure 8A:
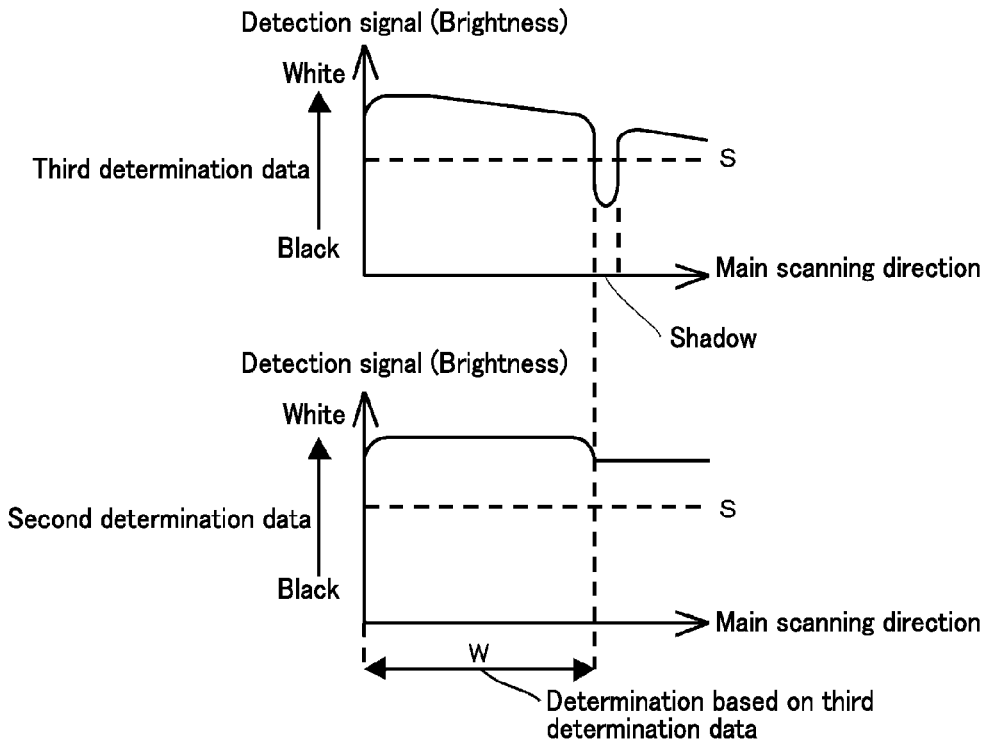
FIGS. 8A and 8B are explanatory drawings for explaining a document size determination operation based on the third determination data and the second determination data in the image reading device according to one embodiment of the present disclosure.
Figure 8B:
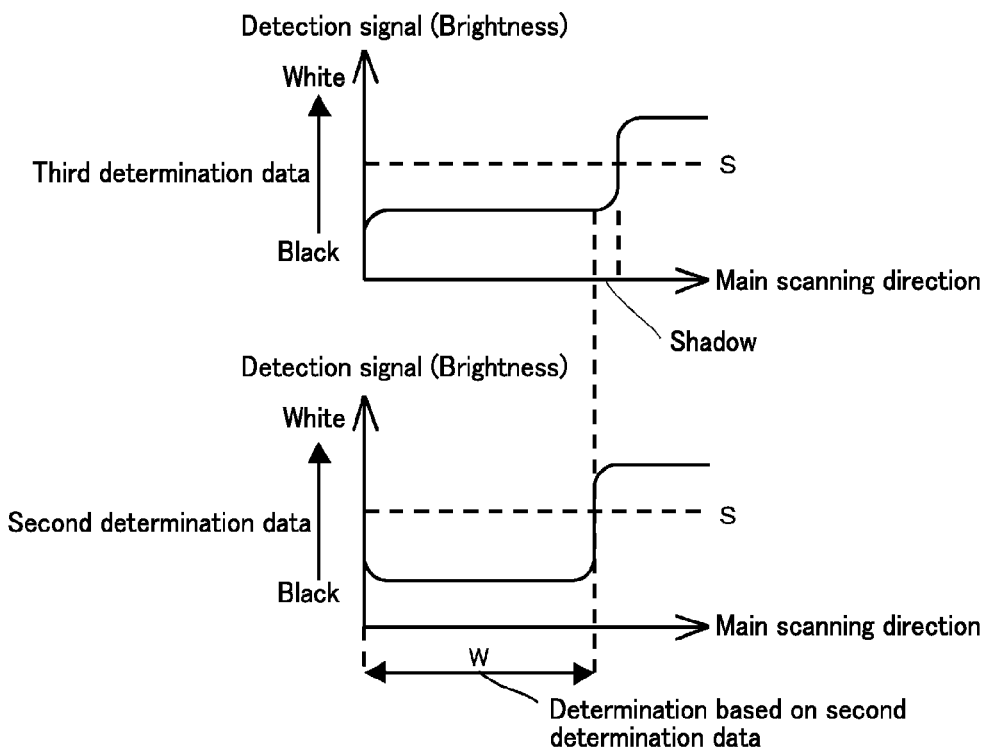

FIG. 8A shows the third and second determination data in the case where the original document MS itself is white. FIG. 8B shows the third and second determination data in the case where the original document MS itself is black. The document pressing surface 34 is white in both FIGS. 8A and 8B.

Next, the document size determination section 71 determines the size of the original document MS in the main scanning direction on the basis of the third determination data obtained in the step S10 and the second determination data obtained in the step S12 (step S13). The document size determination section 71 compares the third determination data (partial lighting-up determination data) and the second determination data (second full lighting-up determination data) with the predetermined threshold value S to determine the size of the original document MS in the main scanning direction.

For example, where the original document MS itself is white, difference in brightness between the regions of the original document MS and the document pressing surface 34 and the region of the shadow provide on the document pressing surface 34 is large as indicated by the detection signal in the third determination data shown in FIG. 8A in the light receiving section 25. Accordingly, when the range of the shadow provided on the document pressing surface 34 is detected on the basis of the third determination data with the threshold value S appropriately set, the width from the main scanning direction reference line A to the region of the document pressing surface 34 where the shadow is provided can be determined as the size of the original document MS in the main scanning direction.

By contrast, where the original document MS itself is black, difference in brightness between the ranges of the original document MS and the other region is large as indicated by the detection signal in the second determination data shown in FIG. 8B in the light receiving section 25. Accordingly, by appropriately setting the threshold value S, a region having a brightness smaller than the threshold value S can be determined as a region of the size of the original document MS in the main scanning direction on the basis of the second determination data.

After the size of the original document MS in the main scanning direction is determined in the step S9 or the step S13, the document size determination section 71 detects/determines the size of the original document MS in the sub scanning direction (step S15). Then, the document size determination operation is terminated. The document size determination section 71 allows the document reading section 2 to execute the length determining scan to obtain the determination data for length determination and determines the size of the original document MS in the sub scanning direction on the basis of the obtained determination data for length determination. Similarly to the aforementioned determination of the size in the main scanning direction, the determination of the size in the sub scanning direction is performed with reference to the difference in brightness between the ranges of the original document MS and the document pressing surface 34 and the range of the document pressing surface 34 where the shadow is provided, as indicated by the detection signal.

For example, where the original document MS itself is white, and the determination of the size in the main scanning direction is performed with reference to the first or third determination data, the length determining scan is executed with only some of the plurality of LED arrays 241a-241k lighted up, similarly to the scan in the step S10. Thus, the boundary between the original document MS and the shadow provided on the document pressing surface 34 can be detected according to the obtained determination data for length determination, thereby determining the size of the original document MS in the sub scanning direction.

By contrast, where the original document MS itself is black, and determination of the size in the main scanning direction is performed with reference to the second determination data, the length determining scan is executed with all of the plurality of LED arrays 241a-241k lighted up, similarly to the scan in the steps S6, S8, and S12. Thus, the boundary between the original document MS and the document pressing surface 34 can be detected according to the obtained determination data for length determination, thereby determining the size of the original document MS in the sub scanning direction. It is noted that since length determination is performed after the color or brightness of the original document MS itself is specified in determining the size of the original document MS in the main scanning direction, as described above, utilization of the determination results of the color or brightness of the original document MS itself can result in efficient determination of the size of the original document MS in the sub scanning direction.

As described above, in Embodiment 1, the image reading device includes the first opening/closing detection sensor 35 configured to detect the open/closed state of the document feeder 3 that covers the platen glass 22, the second opening/closing detection sensor 26 configured to detect the open/closed state of the document feeder 3 with reference to the predetermined threshold angle, and the document size determination section 71. When the first opening/closing detection sensor 35 detects change from the open state to the closed state of the document feeder 3, while the second opening/closing detection sensor 26 detects no open state thereof, the document size determination section 71 obtains the third determination data by the determining scan with some of the plurality of LED arrays 241a-241k, which are located on the side of the main scanning direction reference line A, lighted up. In the third determination data, a shadow of the side of the original document MS, which is apart from the main scanning direction reference line A, is provided on the document pressing surface 34. Accordingly, the brightness of the detection signal in the region of the document pressing surface 34 where the shadow is provided is low. The document size determination section 71 determines the size of the original document in the main scanning direction on the basis of the obtained third determination data. Thus, even when the original document MS is placed on the platen glass 22 in a state in which the document feeder 3 is opened not so largely over the threshold angle, the image reading device can detect the region of the document pressing surface 34 where the shadow is provided on the basis of the third determination data with the threshold value S set appropriately. Thus, the size of a white original document MS in the main scanning direction can be determined reliably.

Further, in Embodiment 1, the LED arrays 241a-241c, which ranges smaller than the minimum width of a supposed original document from the main scanning direction reference line A, are lighted up in the determining scan to obtain the third determination data. With this configuration, the shadow of the side of the original document MS, which is apart from the main scanning direction reference line A, can be provided on the document pressing surface 34 reliably.

Still further, in Embodiment 1, the determination data for length determination in the range over the maximum length LMAX in the sub scanning direction from the sub scanning direction reference line B is obtained. Then, the size of the original document in the sub scanning direction is determined on the basis of the obtained determination data for the length determination. With this configuration, even when a white original document MS is placed on the platen glass 22 in a state in which the document feeder 3 is opened not so largely over the threshold angle, the size of the white original document MS in the sub scanning direction can be determined reliably.

(Embodiment 2)

A copier 1 according to another embodiment of the present disclosure will be described below. The copier 1 according to the present embodiment has a configuration similar to that of the copier 1 of Embodiment 1, except that the position where the original document is placed is different from that in Embodiment 1. In order to avoid redundancy, duplicate description is omitted.

Figure 9:
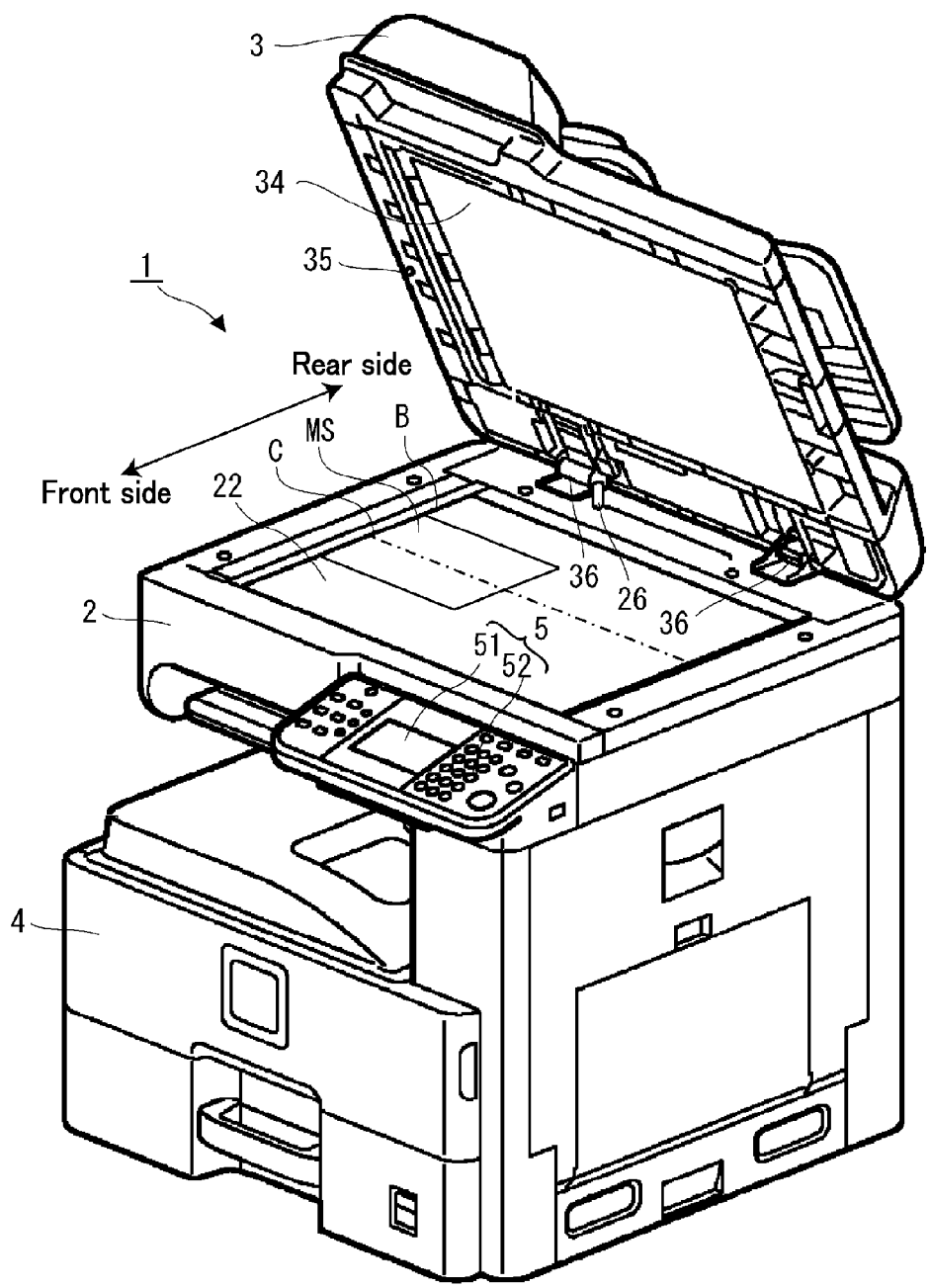
FIG. 9 is an external perspective view showing a configuration of an image forming apparatus including an image reading device according to one embodiment of the present disclosure.

Placement of the original document MS on the platen glass 22 in the present embodiment is carried out as generally called center alignment with the side on the left side of the platen glass 22 when viewing toward the rear side (hereinafter referred to as a sub scanning direction reference line B) and the center line of the platen glass 22 in the main scanning direction (hereinafter referred to as a main scanning direction reference line C) as references, as shown in FIG. 9. It is noted that in the present embodiment, the center line of the original document MS is not necessarily needed to align with the main scanning direction reference line C. The original document MS may be only placed around the main scanning direction reference line C.

A document size determination operation in copier 1 according to the present embodiment will be described next in detail with reference to FIGS. 2-5, and 10A-12B. Although the position where the original document is placed is different from that in Embodiment 1, the process flow is the same. Therefore, the flow in the present embodiment will be described with reference to FIG. 5, which has been referred to in the description of Embodiment 1. Here, description about the steps S1-S5 and S15, which are the same as those in Embodiment 1, are omitted, while description about the steps S6-S13, which are different from those in Embodiment 1, will be made below.

Figure 10A:
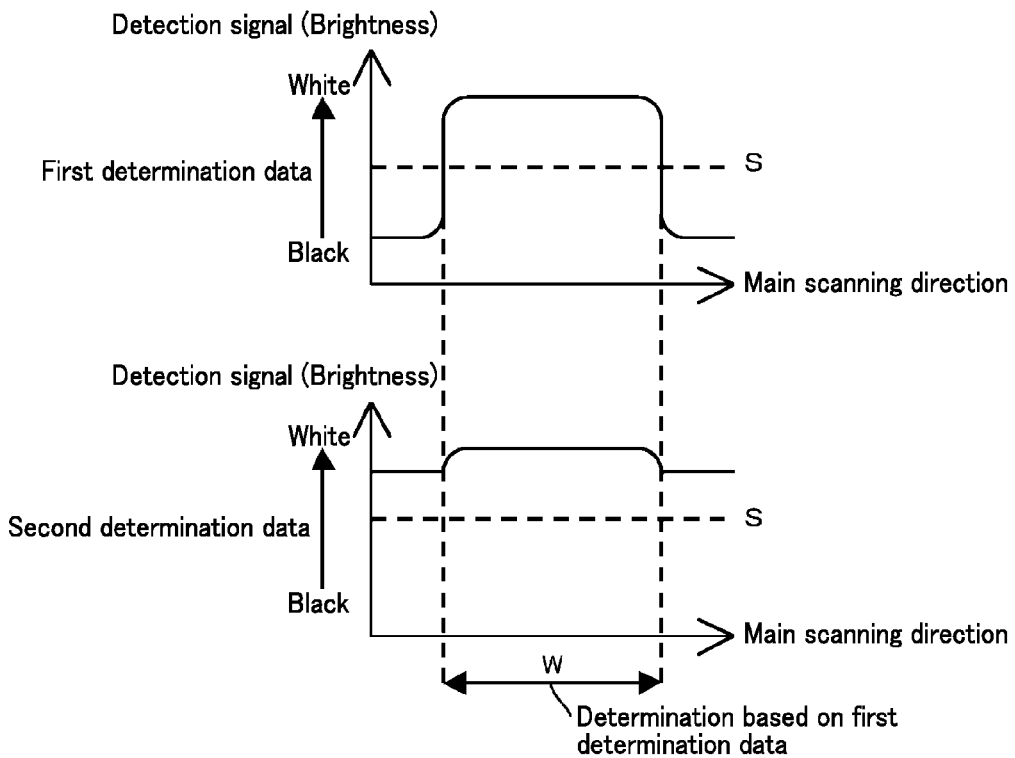
FIGS. 10A and 10B are explanatory drawings for explaining a document size determination operation based on the first determination data and the second determination data in the image reading device according to one embodiment of the present disclosure.
Figure 10B:
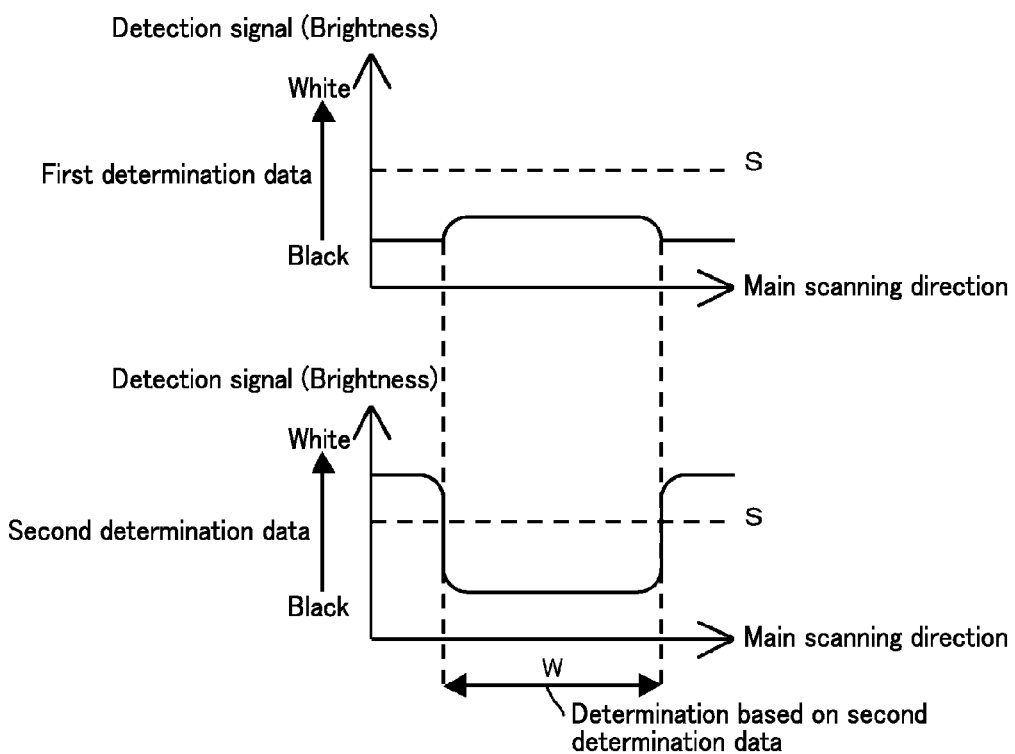

The document reading section 2 performs the width determining scan in a state in which the document feeder 3 is slightly opened in the step S6, thereby obtaining the first determination data as shown in FIGS. 10A and 10B.

Next, the document size determination section 71 observes whether on or not the first opening/closing detection sensor 35 is turned on, that is, whether or not the document feeder 3 is in the closed state (step S7). When it is detected in the step S7 that the first opening/closing detection sensor 35 is turned on, that is, that the document feeder 3 is in the closed state (Yes in step S7), the document size determination section 71 allows the document reading section 2 to execute the width determining scan to obtain the second determination data (step S8).

The document reading section 2 performs the width determining scan in the state in which the document feeder 3 is in the closed state in the step S8, thereby obtaining the second determination data as shown in FIGS. 10A and 10B. FIG. 10A shows the first and second determination data where the original document MS itself is white. FIG. 10B shows the first and second determination data where the original document MS itself is black.

Subsequently, the document size determination section 71 determines the size of the original document MS in the main scanning direction on the basis of the first determination data obtained in the step S6 and the second determination data obtained in the step S8 (step S9). The document size determination section 71 compares the first and second determination data with the predetermined threshold value S to determine the size of the original document MS in the main scanning direction.

Where the original document MS itself is white, difference in brightness between the region of the original document MS and the other region is large as indicted by the detection signal in the first determination data shown in FIG. 10A in the light receiving section 25. Accordingly, by appropriately setting the threshold value S, a region having a brightness equal to or larger than the threshold value S can be determined as a region of the size of the original document MS in the main scanning direction on the basis of the first determination data.

By contrast, where the original document MS itself is black, difference in brightness between the region of the original document MS and the other region is large as indicated by the detection signal in the second determination data shown in FIG. 10B in the light receiving section 25. Accordingly, by appropriately setting the threshold value S, a region having a brightness smaller than the threshold value S can be determined as a region of the size of the original document MS in the main scanning direction on the basis of the second determination data.

Figure 11:
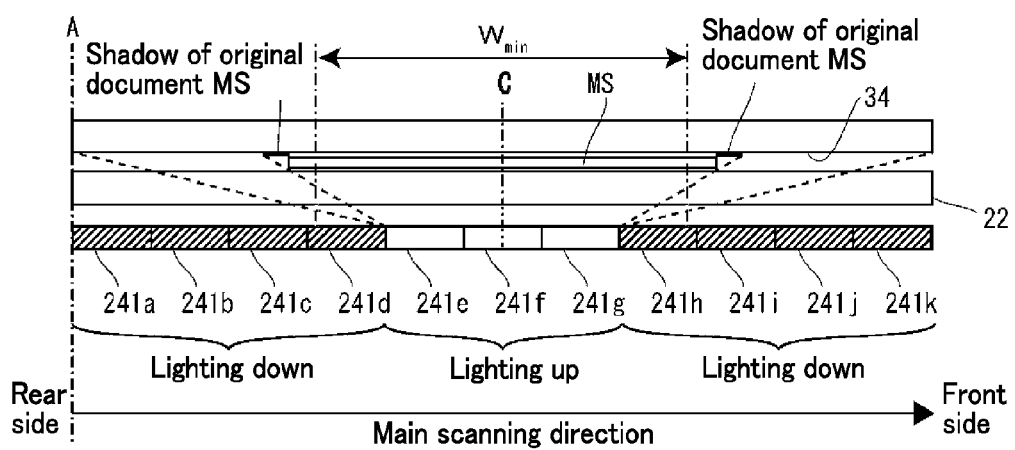
FIG. 11 is a diagram showing a lighting-up state of the light source in obtaining the third determination data in the image reading device according to one embodiment of the present disclosure.

When it is detected in the step S4 that the first opening/closing detection sensor 35 is turned on, that is, that the document feeder 3 is in the closed state, while it is not detected in the step S3 that the second opening/closing detection sensor 26 is turned off, that is, that the angle of the document feeder 3 with respect to the platen glass 22 exceeds the threshold angle (No in step S3), the document size determination section 71 allows the document reading section 2 to execute the width determining scan, thereby obtaining the third determination data (step S10). Further, the document size determination section 71 obtains the second determination data by an operation similar to that in the step S8 (step S12). Different from the other width determining scan (steps S6, S8, and S12), the width determining scan in the step S10 by the document reading section 2 to obtain the third determination data is performed with only some of the plurality of LED arrays 241a-241k, which are located near the main scanning direction reference line C, lighted up, as shown in FIG. 11.

A light-up range of the plurality of LED arrays 241a-241k is narrower than the minimum width WMIN of a supposed original document. In the example shown in FIG. 11, the width determining scan is performed with the LED arrays 241e-241g lighted up and the other LED arrays 241a-241d and 241h-241k lighted down. This provides shadows of the sides on the front and rear sides of the original document MS on the document pressing surface 34. Accordingly, the brightness of the detection signal in the region of the document pressing surface 34 where the shadow is provided is low in the third determination data obtained in the step S10, as shown in FIGS. 12A and 12B.

Figure 12A:
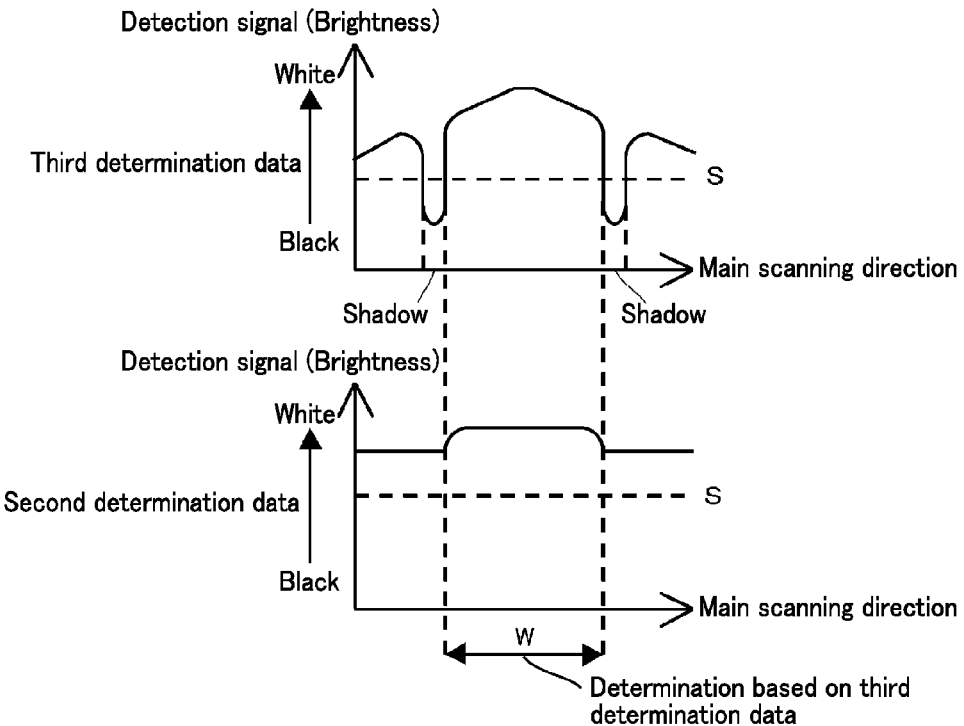
FIGS. 12A and 12B are explanatory drawings for explaining a document size determination operation based on the third determination data and the second determination data in the image reading device according to one embodiment of the present disclosure.
Figure 12B:
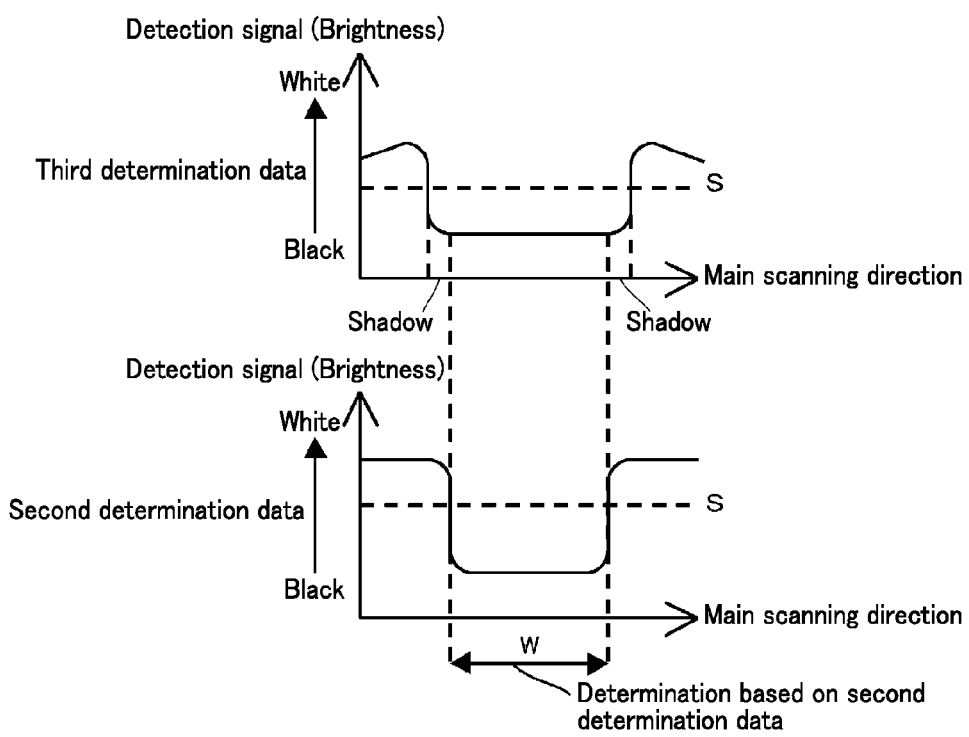

FIG. 12A shows the third and second determination data where the original document MS itself is white. FIG. 12B shows the third and second determination data where the original document MS itself is black.

Thereafter, the document size determination section 71 determines the size of the original document MS in the main scanning direction on the basis the third determination data obtained in the step S10 and the second determination data obtained in the step S12 (step S13). The document size determination section 71 compares the third and second determination data with the predetermined threshold value S to determine the size of the original document MS in the main scanning direction.

For example, where the original document MS itself is white, difference in brightness between the regions of the original document MS and the document pressing surface 34 and the region of the document pressing surface 34 where the shadows are provided is large as indicted by the detection signal in the third determination data shown in FIG. 12A in the light receiving section 25. Accordingly, when the range of the document pressing surface 34 where the shadows are provided is detected on the basis of the third determination data with the threshold value S set appropriately, each position of the sides on the front and rear sides of the original document MS can be detected. According to each position of the sides on the front and rear sides of the original document MS, the width from the side on the front side to the side on the rear side of the original document MS can be determined as the size of the original document MS in the main scanning direction.

By contrast, where the original document MS itself is black, difference in brightness between the region of the original document MS and the other region is large as indicated by the detection signal in the second determination data shown in FIG. 12B in the light receiving section 25. Accordingly, by appropriately setting the threshold value S, a region having a brightness smaller than the threshold value S can be determined as a region of the size of the original document MS in the main scanning direction on the basis of the second determination data. The step 15 is the same as that in Embodiment 1.

As described above, in Embodiment 2, the image reading device includes the first opening/closing detection sensor 35 configured to detect the open/closed state of the document feeder 3 that covers the platen glass 22, the second opening/closing detection sensor 26 configured to detect the open/closed state of the document feeder 3 with reference to the predetermined threshold angle, and the document size determination section 71. When the first opening/closing detection sensor 35 detects change from the open state to the closed state of the document feeder 3, while the second opening/closing detection sensor 26 detects no open state thereof, the document size determination section 71 obtains the third determination data by the determining scan with some of the plurality of LED arrays 241a-241K, which are located near the main scanning direction reference line C, lighted up. In the third determination data, the shadows provided in the document pressing surface 34 reduce the brightness of the detection signal in the region of the shadows of the sides on the front and rear sides of the original document MS. The document size determination section 71 determines the size of the original document in the main scanning direction on the basis of the obtained third determination data. As such, even when the original document MS is placed on the platen glass 22 in a state in which the document feeder 3 is opened not so largely over the threshold angle, the image reading device can reliably determine the size of a white original document MS in the main scanning direction by detecting the shadows provide on document pressing surface 34 on the basis of the third determination data with the threshold value S set appropriately.

Further, in Embodiment 2, the determining scan to obtain the third determination data is performed with the LED arrays 241e-241g in the range narrower than the minimum width of a supposed original document lighted up. With this configuration, the shadows of the sides on the front and rear sides of the original document MS can be reliably provided on the document pressing surface 34.

Still further, in Embodiment 2, the determination data for length determination in the range over the maximum length LMAX in the sub scanning direction from the sub scanning direction reference line B is obtained. Then, the size of the original document in the sub scanning direction is determined on the basis of the obtained determination data for length determination. With this configuration, even when the original document MS is placed on the platen glass 22 in a state in which the document feeder 3 is opened not so largely over the threshold angle, the size of a white original document MS in the sub scanning direction can be reliably determined (Embodiment 3)

A copier 1 according to yet another embodiment of the present disclosure will be described below. The copier 1 according to the present embodiment has a configuration similar to those of the copiers 1 of Embodiments 1 and 2, except that the partial lighting-up determination date is different from that in Embodiments 1 and 2. In order to avoid redundancy, duplicate description is omitted. Placement of the original document MS on the platen glass 22 in the present embodiment is carried out as generally called center alignment similar to that in Embodiment 2.

A document size determination operation in the copier 1 according to the present embodiment will be described next in detail with reference to FIGS. 13-16, in addition to FIGS. 2-12B.

Figure 5:
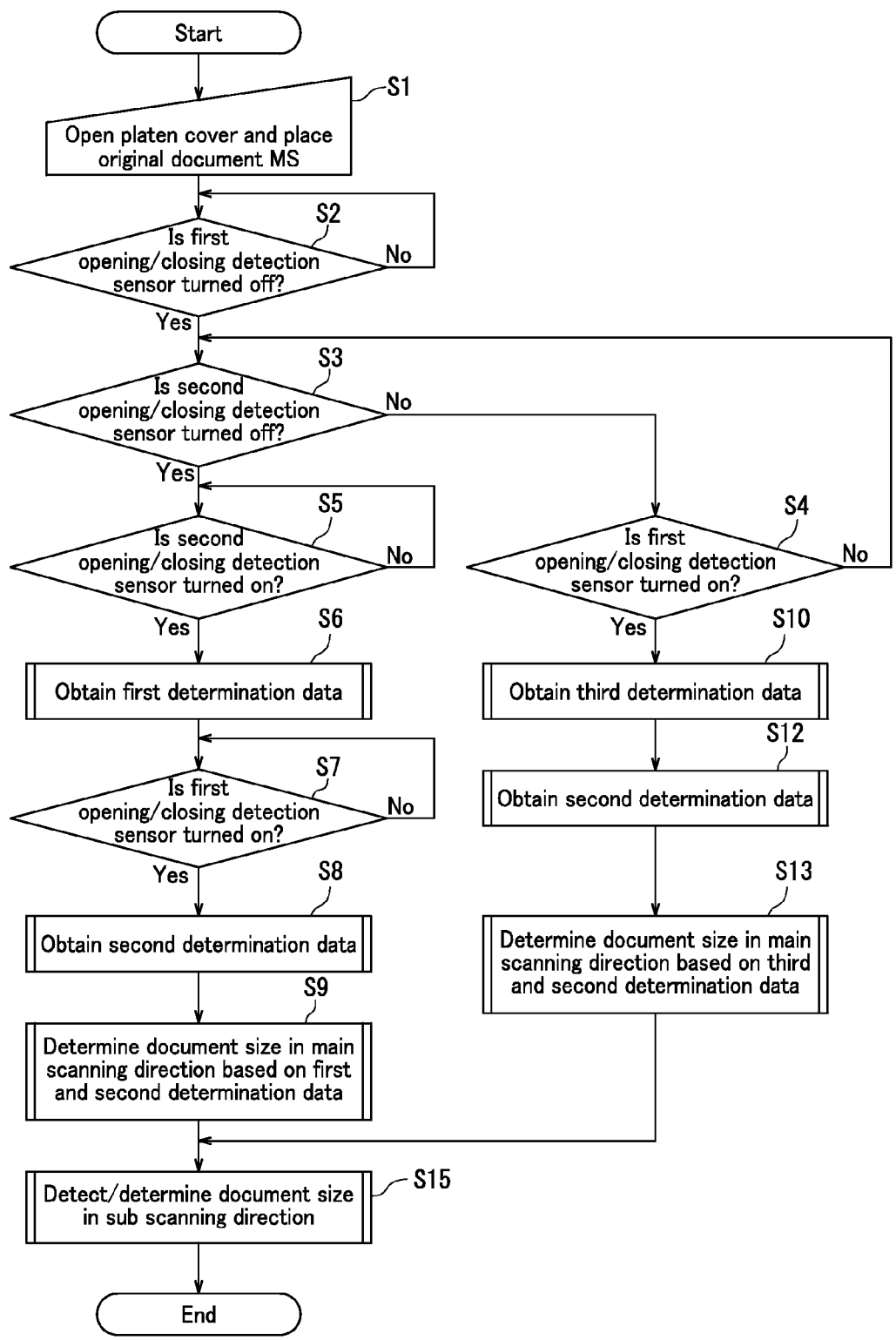
FIG. 5 is a flowchart for explaining a document size determination operation in the image reading device according to one embodiment of the present disclosure.
Figure 13:
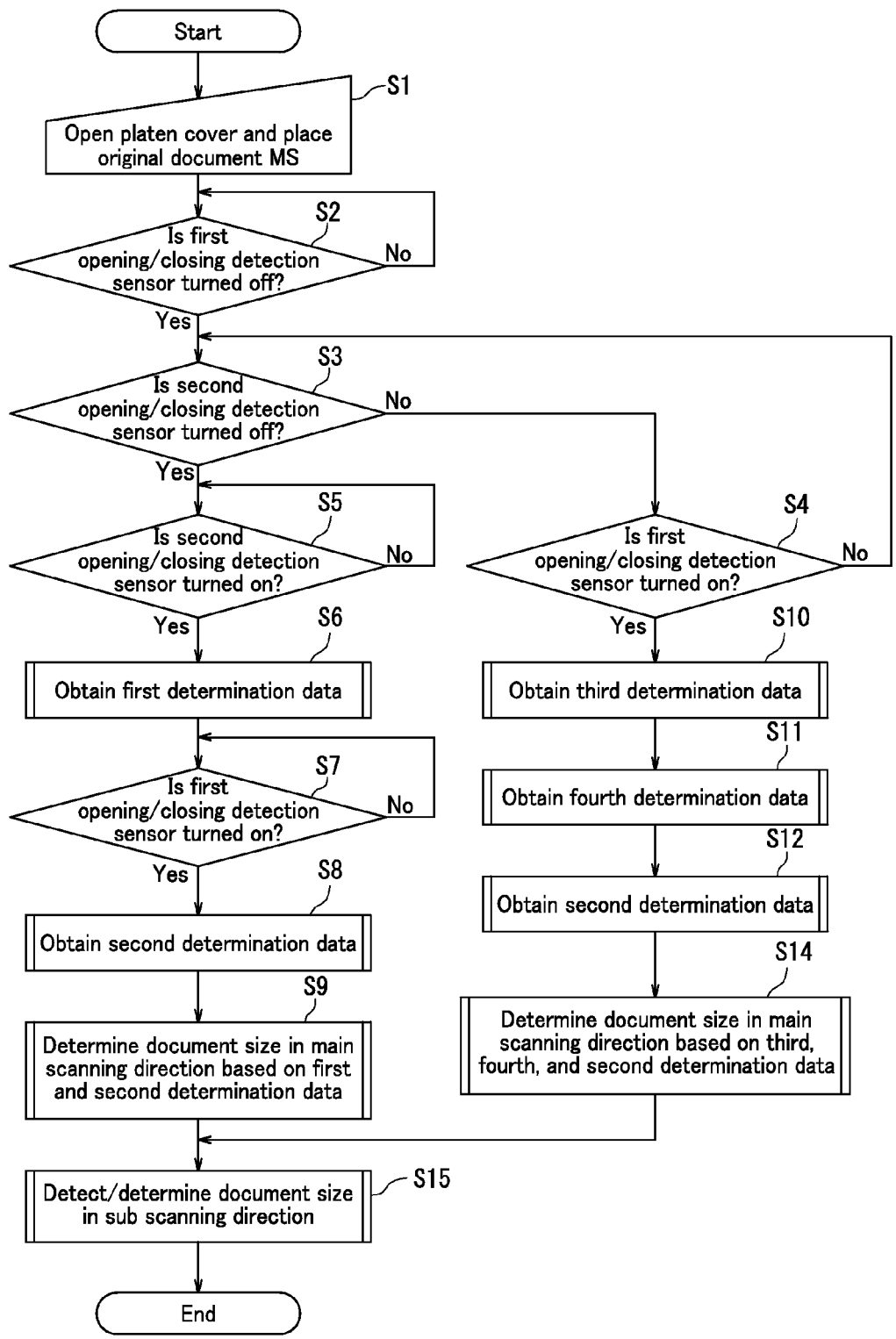
FIG. 13 is a flowchart for explaining a document size determination operation in the image reading device according to one embodiment of the present disclosure.

Referring mainly to FIG. 13, the process flow in Embodiment 3 will be described below. Description about the steps S1-S9 and S15 in the present embodiment, which are the same as those in Embodiment 2 described with reference to FIG. 5, is omitted. Therefore, description about the steps S10-13 will made below predominantly.

When it is detected in the step S4 that the first opening/closing detection sensor 35 is turned on, that is, that the document feeder 3 is in the closed state, while it is not detected in the step S3 that the second opening/closing detection sensor 26 is turned off, that is, the angle of the document feeder 3 with respect to the platen glass 22 exceeds the threshold angle, the document size determination section 71 allows the document reading section 2 to execute the width determining scan to obtain the third determination data (first partial lighting-up determination data) (step S10) and obtains fourth determination data (second partial lighting-up determination data) (step S11).

Figure 15:
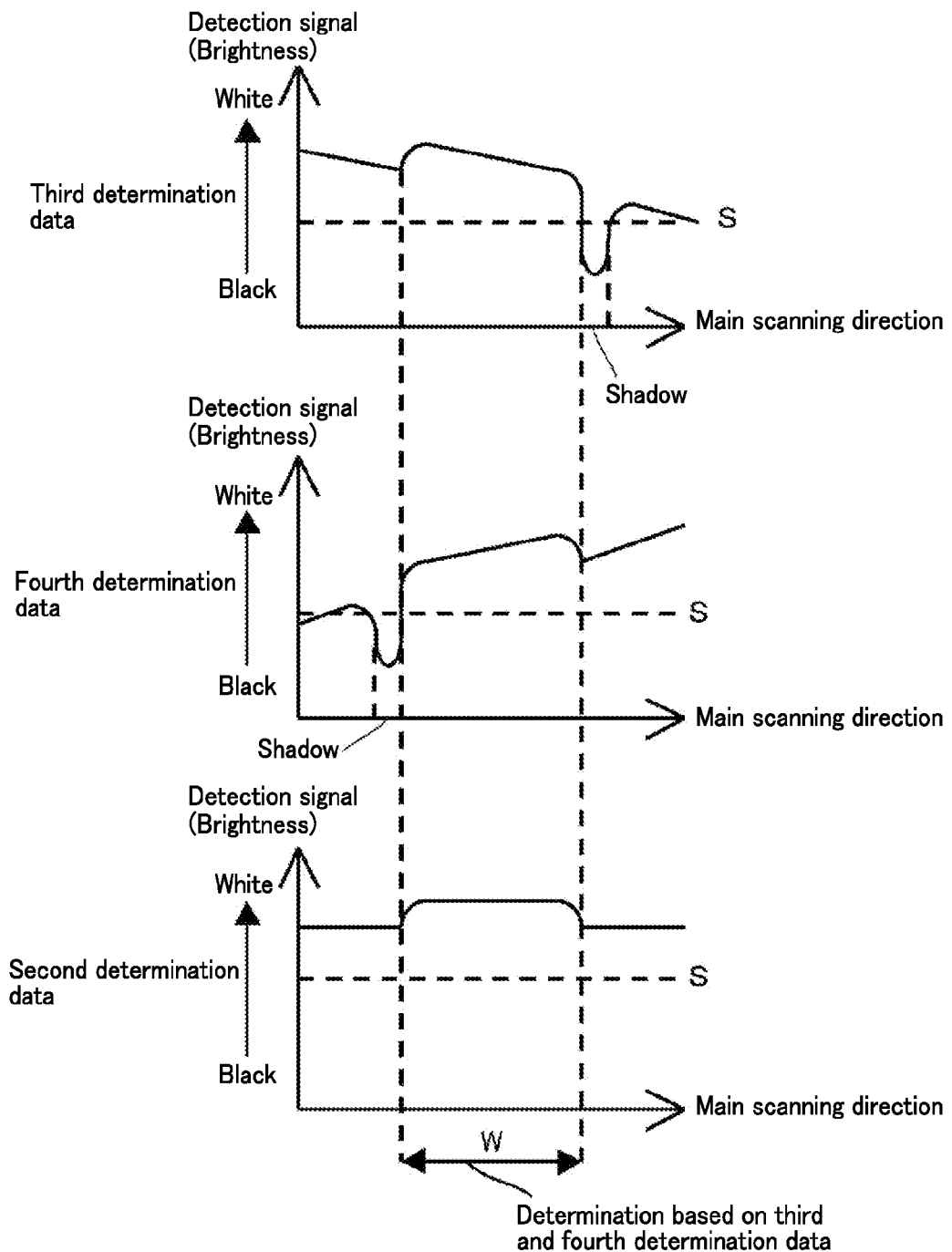
FIG. 15 is an explanatory drawing for explaining a document size determination operation based on the third determination data, fourth determination data, and the second determination data in the image reading device according to one embodiment of the present disclosure.
Figure 16:
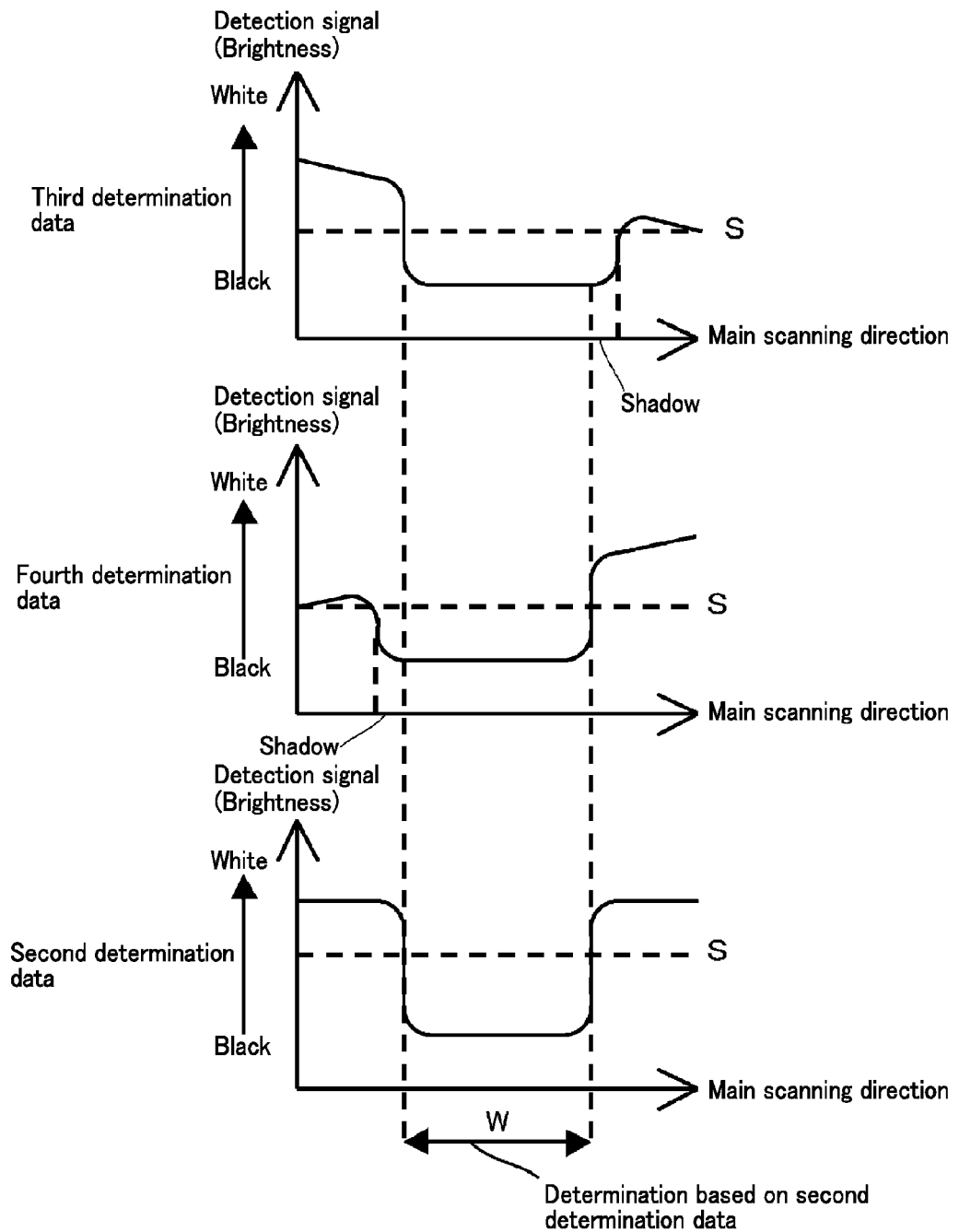
FIG. 16 is an explanatory drawing for explaining a document size determination operation based on the third determination data, the fourth determination data, and the second determination data in the image reading device according to one embodiment of the present disclosure.

Further, the second determination data is obtained by the operation similar to that in the step S8 (step S12). FIG. 15 shows the third, fourth, and second determination data where the original document MS itself is white. FIG. 16 shows the third, fourth, and second determination data where the original document MS itself is black. It is noted that each of the third and fourth determination data is obtained with some of the plurality of LED arrays 241a-241k lighted up.

Different from the width determining scan in the steps S6, S8, and S12, the width determining scan in the step S10 by the document reading section 2 to obtain the third determination data (first partial lighting-up determination data) is front side position determining scan to determine the position of the side on the front side of the original document MS. Specifically, as shown in FIG. 14A, the front side position determining scan is performed with only some of the plurality of LED arrays 241a-241k, which are located on the rear side, lighted up.

Figure 14A:
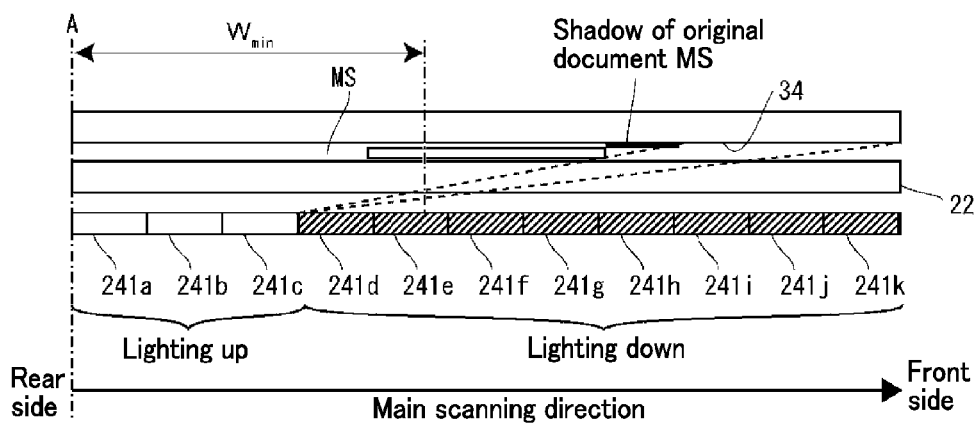
FIGS. 14A and 14B are diagrams showing lighting-up states of the light source in obtaining the third determination data and fourth determination data, respectively, in the image reading device according to one embodiment of the present disclosure.

In the example shown in FIG. 14A, the width determining scan is performed with the LED arrays 241a-241c lighted up and the other LED arrays 241d-241k lighted down. This can provide a shadow of the side on the front side of the original document MS on the document pressing surface 34. Accordingly, the brightness of the detection signal in the region of the document pressing surface 34 where the shadow is provided is low in the third determination data obtained in the step S10, as shown in FIG. 15.

It is noted that a light-up range of the plurality of LED arrays 241a-241k in the front side position determining scan is set narrower than the range of the minimum width WMIN of a supposed original document from the side on the rear side of the platen glass 22. Thus, the shadow can be provided reliably in a region corresponding to the side on the front side of the original document MS.

Figure 14B:
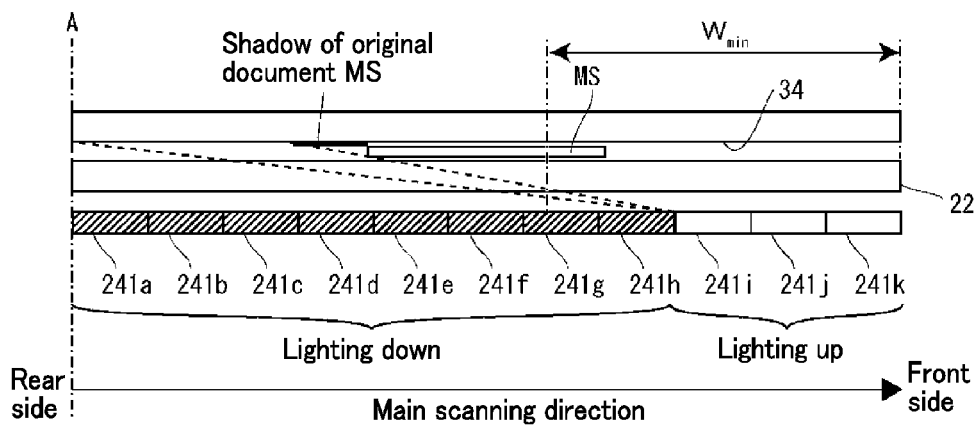

Different from the width determining scan in the steps S6, S8, and S12, the width determining scan in the step S11 by the document reading section 2 to obtain the fourth determination data (second partial lighting-up determination data) is rear side position determining scan to determine the position of the side on the rear side of the original document MS. Specifically, as shown in FIG. 14B, the rear side position determining scan is performed with only some of the plurality of LED arrays 241a-241k, which are located on the front side, lighted up. In the example shown in FIG. 14B, the width determining scan is performed with the LED arrays 241i-241k lighted up and the other LED arrays 241a-241h lighted down. This can provide a shadow of the side on the rear side of the original document MS on the document pressing surface 34. Accordingly, the brightness of the detection signal in the region of the document pressing surface 34 where the shadow is provided is low in the fourth determination data obtained in the step S11, as shown in FIG. 15.

It is noted that a light-up range of the plurality of LED arrays 241a-241k in the rear side position determining scan is set narrower than the range of the minimum width WMIN of a supposed original document from the side on the front side of the platen glass 22. Thus, the shadow can be provided reliably in a region corresponding to the side on the rear side of the original document MS.

Subsequently, the document size determination section 71 determines the size of the original document MS in the main scanning direction on the basis of the third determination data obtained in the step S10, the fourth determination data obtained in the step S11, and the second determination data obtained in the step S12 (step S14). The document size determination section 71 compares the third, fourth, and second determination data with the predetermined threshold value S to determine the size of the original document MS in the main scanning direction. Specifically, where the original document MS itself is white, as shown in FIG. 15, difference in brightness between the regions of the original document MS and the document pressing surface 34 and the region of the document pressing surface 34 where the shadow of the side on the front side of the original document MS is provided is large as indicated by the detection signal in the third determination data in the light receiving section 25. As well, difference in brightness between the regions of the original document MS and the document pressing surface 34 and the region of the document pressing surface 34 where the shadow of the side on the rear side of the original document MS is provided is large as indicated by the detection signal in the fourth determination data in the light receiving section 25. Accordingly, when the region of the document pressing surface 34 where each shadow is provided is detected on the basis of the third and fourth determination data with the threshold value S set appropriately, the positions of the sides on the front and rear sides of the original document MS can be detected. Then, the width from the side on the front side of the original document MS to the side on the rear side of the original document MS is determined as the size of the original document MS in the main scanning direction.

By contrast, where the original document MS itself is black, difference in brightness between the region of the original document MS and the other region is large as indicated by the detection signal in the second determination data shown in FIG. 16 in the light receiving section 25. Accordingly, by appropriately setting the threshold value S, a region having a brightness smaller than the threshold value S can be determined as a region of the size of the original document MS in the main scanning direction on the basis of the second determination data.

After determination of the size of the original document MS in the main scanning direction in the step S9 or S13, the document size determination section 71 detects/determines the size of the original document MS in the sub scanning direction (step S15). Then, the document size determination operation is terminated. The document size determination section 71 allows the document reading section 2 to execute the length determining scan to obtain the determination data for length determination and determines the size of the original document MS in the sub scanning direction on the basis of the obtained determination data for length determination. Similarly to the above described determination of the size in the main scanning direction, the determination of the size in the sub scanning direction is performed on the basis of the difference in brightness indicated by the detection signal between the regions of the original document MS and the document pressing surface 34 and the region of the document pressing surface 34 where the shadow is provided. Accordingly, when determination of the size in the main scanning direction is performed on the basis of the first determination data or the third and fourth determination data in the case where the original document MS itself is white, the length determining scan is performed with only some of the LED arrays 241a-241k lighted up similarly to that in the steps S10 and S11.

In this case, the lighted-up LED arrays out of the LED arrays 241a-241k may be only some LED arrays located on the rear side similarly to those in the step S10, or only some LED arrays located on the front side similarly to those in the step S11. Thus, the boundary between the original document MS and the shadow provided on the document pressing surface 34 (side on front or rear side of original document MS) can be detected on the basis of the obtained determination data for length determination, thereby enabling determination of the size of the original document MS in the sub scanning direction.

By contrast, when determination of the size in the main scanning direction is performed on the basis of the second determination data in the case where the original document MS itself is black, the length determining scan is performed with all of the plurality of LED arrays 241a-241k lighted up, similarly to those in the steps S6, S8, and S12. Thus, the boundary between the original document MS and the document pressing surface 34 can be detected on the basis of the obtained determination data for length determination, thereby enabling determination of the size of the original document MS in the sub scanning direction.

As describe above, in Embodiment 3, the image reading device includes the first opening/closing detection sensor 35 configured to detect the open/closed state of the document feeder 3 that covers the platen glass 22, the second opening/closing detection sensor 26 configured to detect the open/closed state of the document feeder 3 with reference to the predetermined threshold angle, and the document size determination section 71. When the first opening/closing detection sensor 35 detects change from the open state to the closed state of the document feeder 3, while the second opening/closing detection sensor 26 detects no open state thereof, the document size determination section 71 obtains the third determination data by the front side position determining scan with some of the plurality of LED arrays 241a-241k, which are located on the rear side in the main scanning direction, lighted up. The document size determination section 71 also obtains the fourth determination data by the rear side position determining scan with some of the plurality of LED arrays 241a-241k, which are located on the front side in the main scanning direction, lighted up. The brightness of the detection signal in the region of the shadow of the side on the front side of the original document MS is low in the third determination data. As well, the brightness of the detection signal in the region of the shadow of the side on the rear side of the original document MS is low in the fourth determination data. The document size determination section 71 determines the size of the original document in the main scanning direction on the basis of the obtained third and fourth determination data. Thus, even when the original document MS is placed on the platen glass 22 in a state in which the document feeder 3 is opened not so largely over the threshold angle, the image reading device can detect the region of the document pressing surface 34 where the shadows are provided on the basis of the third and fourth determination data with the threshold value S set appropriately. This can result in reliable determination of the size of a white original document MS in the main scanning direction.

Furthermore, in Embodiment 3, the LED arrays 241a-241c in the range narrower than the minimum width of a supposed original document from the rear side in the main scanning direction are lighted up in the front side position determining scan to obtain the third determination data. Also, the LED arrays 241i-241k in the range narrower than the minimum width of the supposed original document from the front side in the main scanning direction are lighted up in the rear side position determining scan to obtain the fourth determination data. With this configuration, the shadows can be reliably provided in regions corresponding to the respective sides on the front and rear sides of the original document MS.

Yet further, in Embodiment 3, the determination data for length determination is obtained in the range over the maximum length LMAX in the sub scanning direction from the sub scanning direction reference line B. Then, the size of the original document in the sub scanning direction is determined on the basis of the obtained determination data for length determination. With this configuration, even when a white original document MS is placed on the platen glass 22 in a state in which the document feeder 3 is opened not so largely over the threshold angle, the size of the white original document MS in the sub scanning direction can be reliably determined It is noted that in Embodiments 1-3 described above, the document feeder 3 that conveys an original document MS functions as the platen cover, which however, should not be taken to limit the present disclosure. The platen cover may not have a function of conveying an original document MS as far as it can open/close the platen glass 22.

Further, in Embodiments 1-3 described above, the point where the determination result from the second opening/closing detection sensor 26 is changed is apart from the platen glass 22 further than the point where the determination result from the first opening/closing detection sensor 35 is changed, which however, should not be taken to limit the present disclosure. The point where the determination result from the first opening/closing detection sensor 35 is changed may be apart from the platen glass 22 further than the point where the determination result from the second opening/closing detection sensor 26 is changed.

Moreover, in Embodiments 1-3 described above, the second opening/closing detection sensor 26 determines the open/closed state of the document feeder 3 with reference to the predetermined threshold angle, which however, should not be taken to limit the present disclosure. The first opening/closing detection sensor 35 may determine the open/closed state of the document feeder 3 with reference to the predetermined threshold angle.

Yet further, in Embodiments 1-3 described above, the second opening/closing detection sensor 26 is provided in the document reading section 2, while the first opening/closing detection sensor 35 is provided in the document feeder 3. However, this should not be taken to limit the present disclosure. It is possible that the first opening/closing detection sensor 35 is provide in the document reading section 2, and the second opening/closing detection sensor 26 is provided in the document feeder 3. Alternatively, both the first opening/closing detection sensor 35 and the second opening/closing detection sensor 26 may be provided in one of the document reading section 2 and the document feeder 3.

Still further, in Embodiments 1-3 described above, the light source 24 and the light receiving section 25 move integrally, which however, should not be taken to limit the present disclosure. The light source 24 and the light receiving section 25 may be separate from each other to move independently. Alternatively, the light source 24 may move in the sub scanning direction, while the light receiving section 25 may be fixed.

It is apparent that the present disclosure is not limited to the above embodiments, and each embodiment can be appropriately altered within the scope of technical idea of the present disclosure. Furthermore, the number, position, shape, etc. of each of the above members are not limited and can be changed to any suitable number, position, shape, etc. for practical use of the present disclosure.

What is claimed is:

1. An image reading device, comprising:
   a platen glass on which an original document is to be placed;
   a platen cover capable of opening/closing the platen glass;
   a light source including a plurality of light emitting elements arranged in a main scanning direction, each of the light emitting elements being configured to irradiate light;
   a light receiving section configured to receive light from the light source;
   a first opening/closing detection section configured to determine on the basis of a first reference whether the platen cover is in an open state or a closed state relative to the platen glass;
   a second opening/closing detection section configured to determine on the basis of a second reference, which is different from the first reference, whether the platen cover is in an open state or a closed state relative to the platen glass; and
   an document size determination section configured to determine a size of the original document on the basis of a measurement result from the light receiving section,
   wherein where determination results from the first opening/closing detection section and the second opening/closing detection section indicate the open state when the original document is placed on the platen glass:
      when the determination result from the second opening/closing detection section is changed from the open state to the closed state, the light receiving section obtains first full lighting-up determination data, which is measured with all of the plurality of light emitting elements lighted up;
      when the determination result from the first opening/closing detection section is changed from the open state to the closed state, the light receiving section obtains second full lighting-up determination data, which is measured with all of the plurality of light emitting elements lighted up; and the document size determination section determines a size of the original document in the main scanning direction on the basis of the first full lighting-up determination data and the second full lighting-up determination data, and where the determination result from the first opening/closing detection section indicates the open state, and the determination result from the second opening/closing detection section indicates no open state when the original document is placed on the platen glass:

when the determination result from the first opening/closing detection section is changed from the open state to the closed state, the light receiving section obtains the second full lighting-up determination data, which is measured with all of the plurality of light emitting elements lighted up, and obtains partial lighting-up determination data, which is measured with some of the light emitting elements of the plurality of light emitting elements lighted up; and the document size determination section determines the size of the original document in the main scanning direction on the basis of the second full lighting-up determination data and the partial lighting-up determination data.

2. The image reading device of claim 1, wherein
in obtaining the partial lighting-up determination data, some light emitting elements of the plurality of light emitting elements, which are located on a side of a main scanning direction reference line for alignment of the original document in the main scanning direction, are lighted up, and the other light emitting elements are lighted down.

3. The image reading device of claim 2, wherein
in obtaining the partial lighting-up determination data, some light emitting elements of the plurality of light emitting elements, which are located within a range of a minimum width of a supposed original document from the main scanning direction reference line, are lighted up.

4. The image reading device of claim 1, wherein
the light receiving section obtains determination data in a range over a maximum length of a supposed original document in a sub scanning direction from a sub scanning direction reference line for alignment of the original document in the sub scanning direction with at least one light emitting element of the plurality of light emitting elements lighted up, and the document size determination section determines the size of the original document in the sub scanning direction on the basis of the determination data that the light receiving section obtains.

5. The image reading device of claim 1, wherein
in obtaining the partial lighting-up determination data, light emitting elements of the plurality of light emitting elements arranged in the main scanning direction, which are located around the center, are lighted up, and light emitting elements of the plurality of light emitting elements, which are located on opposite end portions, are lighted off.

6. The image reading device of claim 5, wherein
in obtaining the partial lighting-up determination data, light emitting elements of the plurality of light emitting elements, which are located within a range of a minimum width of a supposed original document, are lighted up.

7. The image reading device of claim 5, wherein
the light receiving section obtains determination data in a range over a maximum length of a supposed original document in a sub scanning direction from a sub scanning direction reference line for alignment of the original document in the sub scanning direction, and the document size determination section determines a size of the original document in the sub scanning direction on the basis of the determination data that the light receiving section obtains.

8. The image reading device of claim 1, wherein
in obtaining the partial lighting-up determination data, the light receiving section obtains first partial lighting-up determination data measured with light emitting elements, which are located in one of end portions of the plurality of light emitting elements arranged in the main scanning direction, lighted up, and obtains second partial lighting-up determination data measured with light emitting elements, which are located in the other end portions of the plurality of light emitting elements, lighted up, and the document size determination section determines a size of the original document in the main scanning direction on the basis of the second full lighting-up determination data, the first partial lighting-up determination data, and the second partial lighting-up determination data.

9. The image reading device of claim 8, wherein
in obtaining the first partial lighting-up determination data, light emitting elements, which are located in a range of a minimum width of a supposed original document from one of ends of the plurality of light emitting elements arranged in the main scanning direction, are lighted up, and in obtaining the second partial lighting-up determination data, light emitting elements, which are located in a range of the minimum width of the supposed original document from the other end of the plurality of light emitting elements, are lighted up.

10. The image reading device of claim 8, wherein
in obtaining the first partial lighting-up determination data or the second partial lighting-up determination data, the light receiving section obtains determination data in a range over a maximum length of a supposed original document in a sub scanning direction from a sub scanning direction reference line for alignment of the original document in the sub scanning direction, and the document size determination section determines a size of the original document in the sub scanning direction on the basis of the determination data that the light receiving section obtains.

11. The image reading device of claim 1, wherein
the light emitting elements include light emitting diodes.

12. The image reading device of claim 1, wherein
the second opening/closing detection section determines whether the platen cover is in the open state or the closed state with reference to a predetermined threshold angle.

* * * * *